US012665299B2

(12) United States Patent
Khadri et al.

(10) Patent No.: US 12,665,299 B2
(45) Date of Patent: Jun. 23, 2026

(54) ANTENNA DEVICE WITH TWO DIPOLE ARRAYS AND ASSOCIATED COMMUNICATION SYSTEM

(71) Applicant: TDF, Montrouge (FR)

(72) Inventors: Belkacem Khadri, Poissy (FR); Sebastien Palud, Betton (FR)

(73) Assignee: TDE, Montrouge (FR)

( * ) Notice: Subject to any disclaimer, the term of this patent is extended or adjusted under 35 U.S.C. 154(b) by 10 days.

(21) Appl. No.: 18/722,288

(22) PCT Filed: Nov. 4, 2022

(86) PCT No.: PCT/EP2022/080870
§ 371 (c)(1),
(2) Date: Jun. 20, 2024

(87) PCT Pub. No.: WO2023/117192
PCT Pub. Date: Jun. 29, 2023

(65) Prior Publication Data
US 2024/0421481 A1 Dec. 19, 2024

(30) Foreign Application Priority Data
Dec. 20, 2021 (FR) ...................................... 2114034

(51) Int. Cl.
*H01Q 5/48* (2015.01)
*H01Q 1/12* (2006.01)
*H01Q 1/52* (2006.01)
*H01Q 21/08* (2006.01)

(52) U.S. Cl.
CPC ............. *H01Q 5/48* (2015.01); *H01Q 1/1242* (2013.01); *H01Q 1/521* (2013.01); *H01Q 21/08* (2013.01)

(58) Field of Classification Search
CPC ........ H01Q 1/1242; H01Q 1/521; H01Q 5/42; H01Q 5/48; H01Q 21/08
See application file for complete search history.

(56) References Cited

U.S. PATENT DOCUMENTS 5,497,166 A 3/1996 Mahnad
2020/0287296 A1 9/2020 Kwak et al.

FOREIGN PATENT DOCUMENTS

CN 107078390 A * 8/2017 ............. H01Q 1/523
CN 107743665 A * 2/2018 ............... H01Q 1/38
CN 113097748 A * 7/2021 ............. H01Q 21/28
DE 102004057774 A1 6/2006
FR 2501423 A1 9/1982
WO 2015029946 A1 3/2015

* cited by examiner

*Primary Examiner* — Hoang V Nguyen
(74) *Attorney, Agent, or Firm* — FisherBroyles, LLP; Roger L. Browdy; Ronni S. Jillions

(57) ABSTRACT

The invention relates to an antenna device (102) comprising a low-frequency array (104) of low-frequency dipoles (112) having respective centres (112*c*) aligned on a so-called vertical axis (A1); a high-frequency array (106) of high-frequency dipoles (114) having respective centres (114*c*) following one another vertically; and a support (115) for the low-frequency dipoles (112) and the high-frequency dipoles (114). The device is characterised in that the high-frequency dipoles (114) are arranged so that the centre (112*c*) of each low-frequency dipole (112) is positioned vertically between the centres (114*c*) of a pair (P1; P2) of two high-frequency dipoles (114).

17 Claims, 25 Drawing Sheets

[Fig.1]
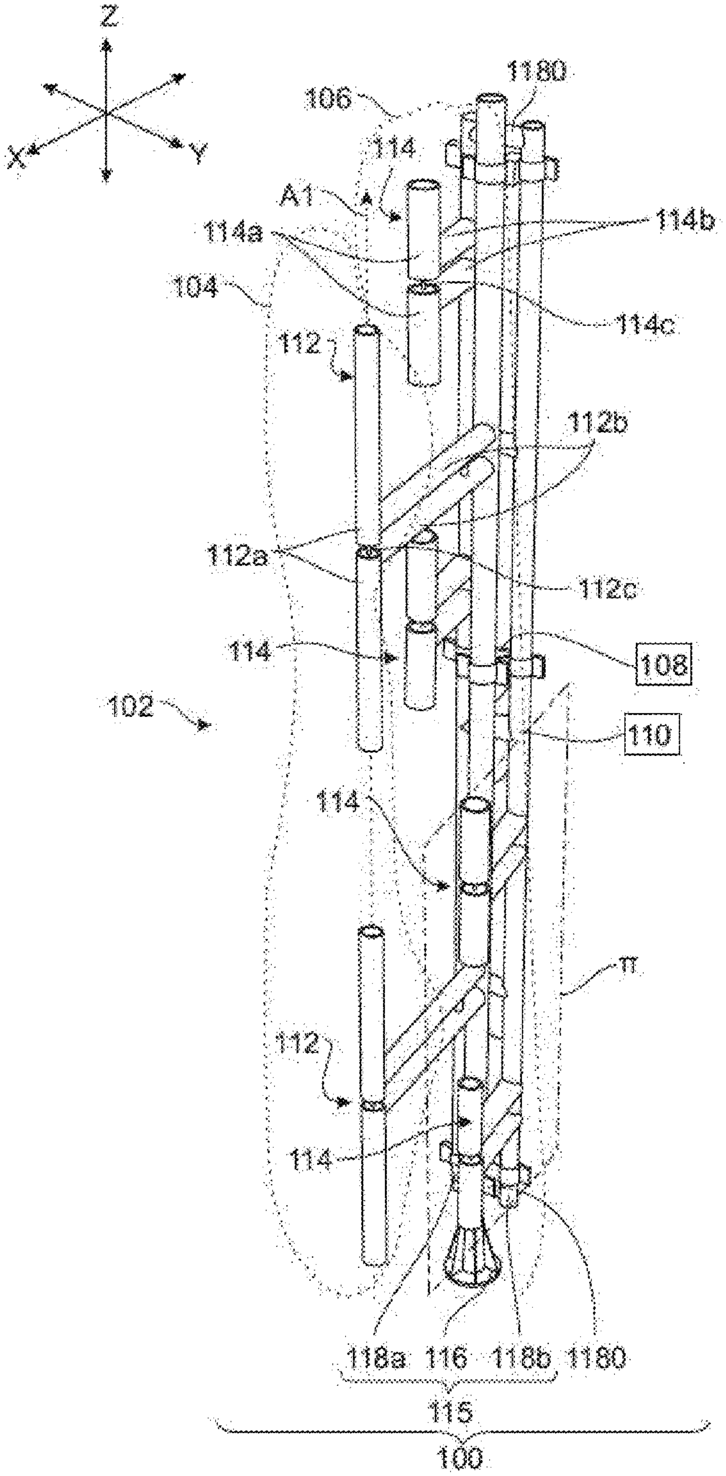

[Fig.2]
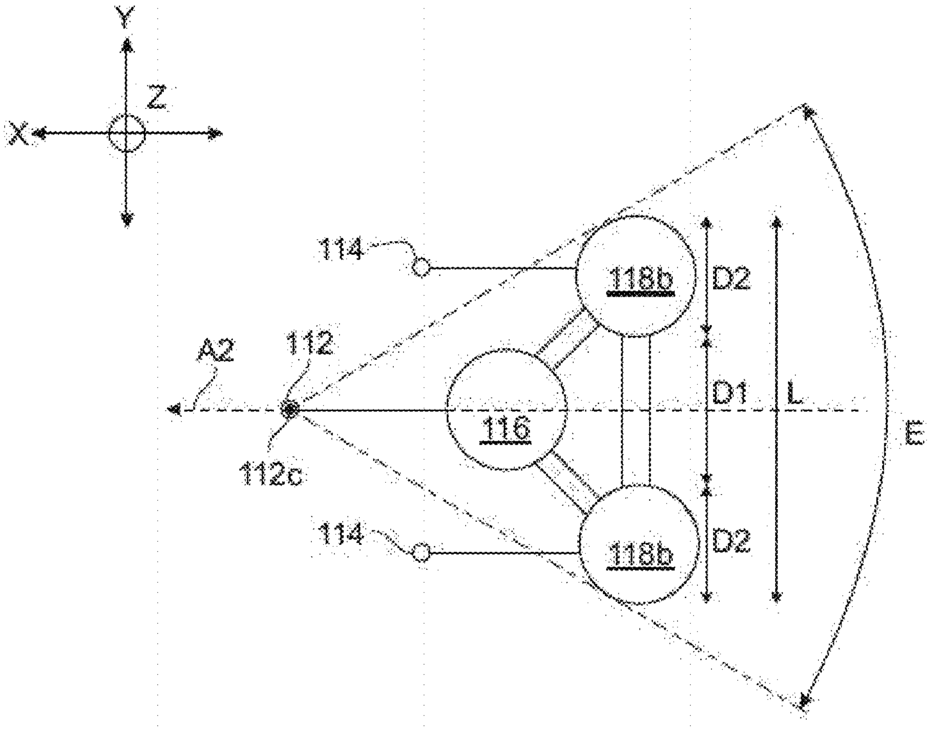

[Fig.3]
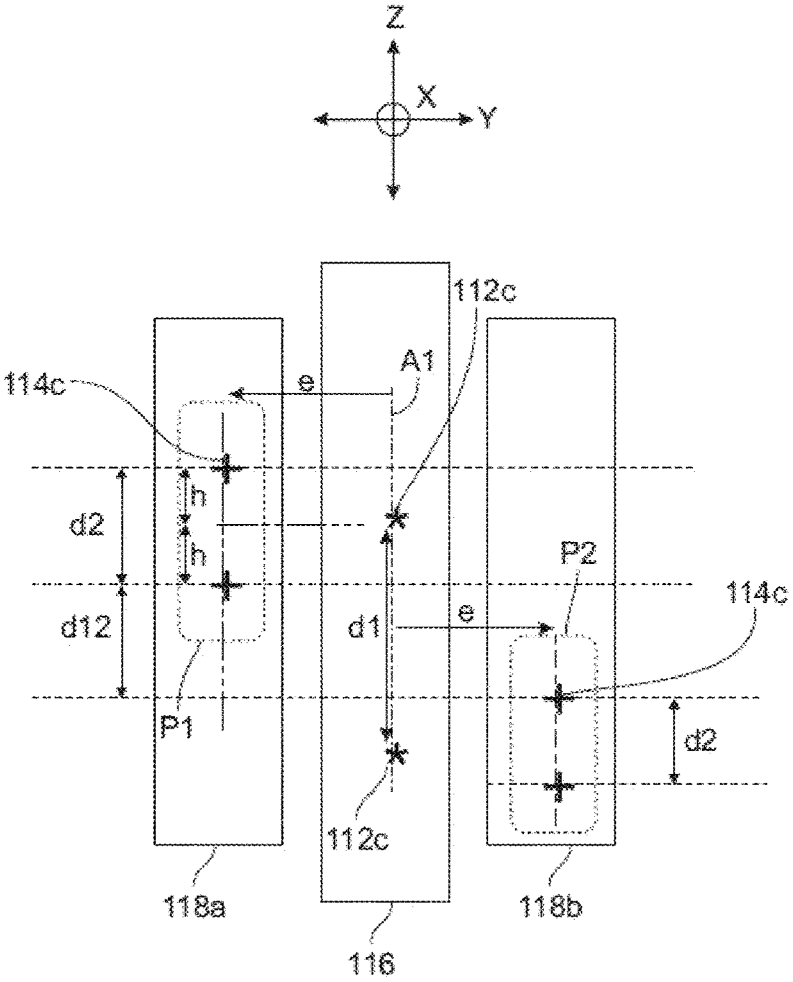

[Fig.4]
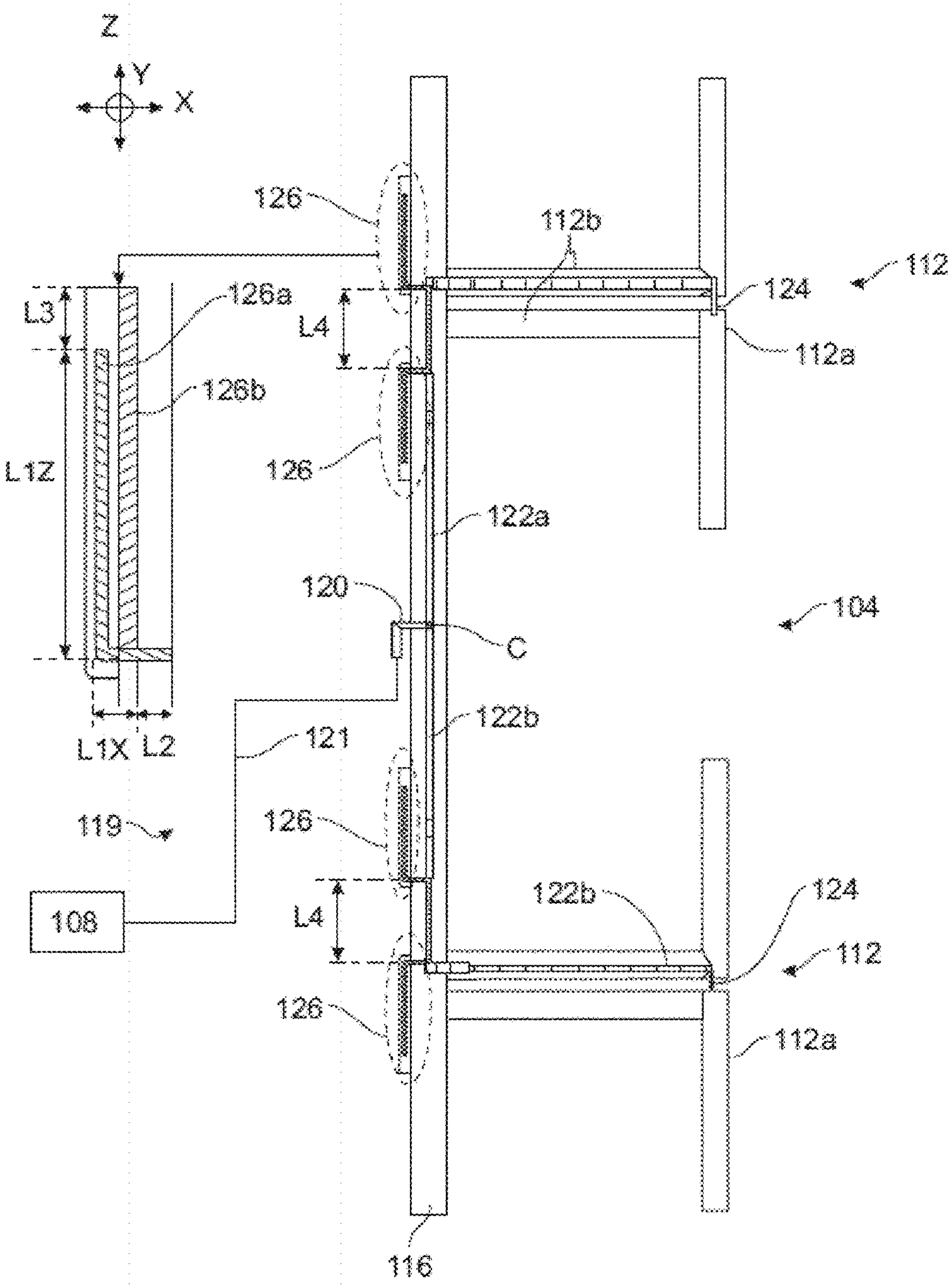

[Fig.5]
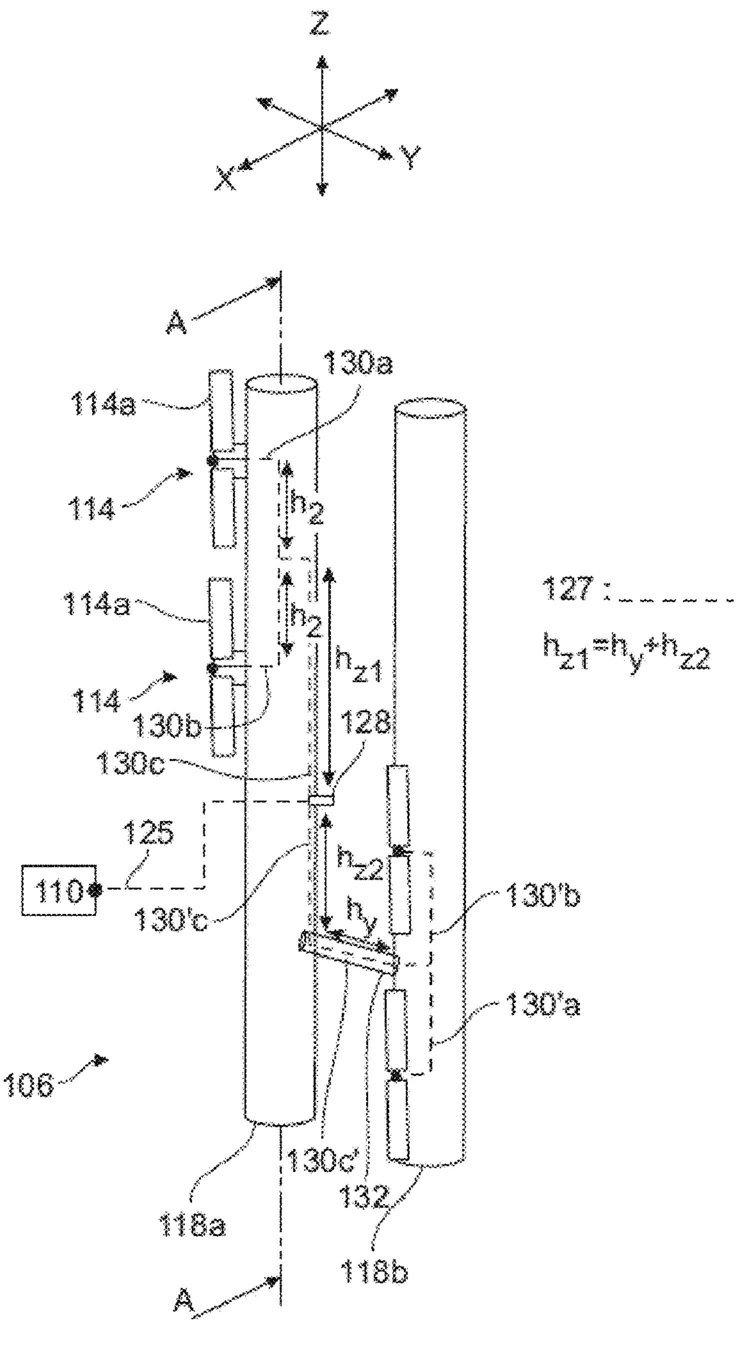

[Fig.6]
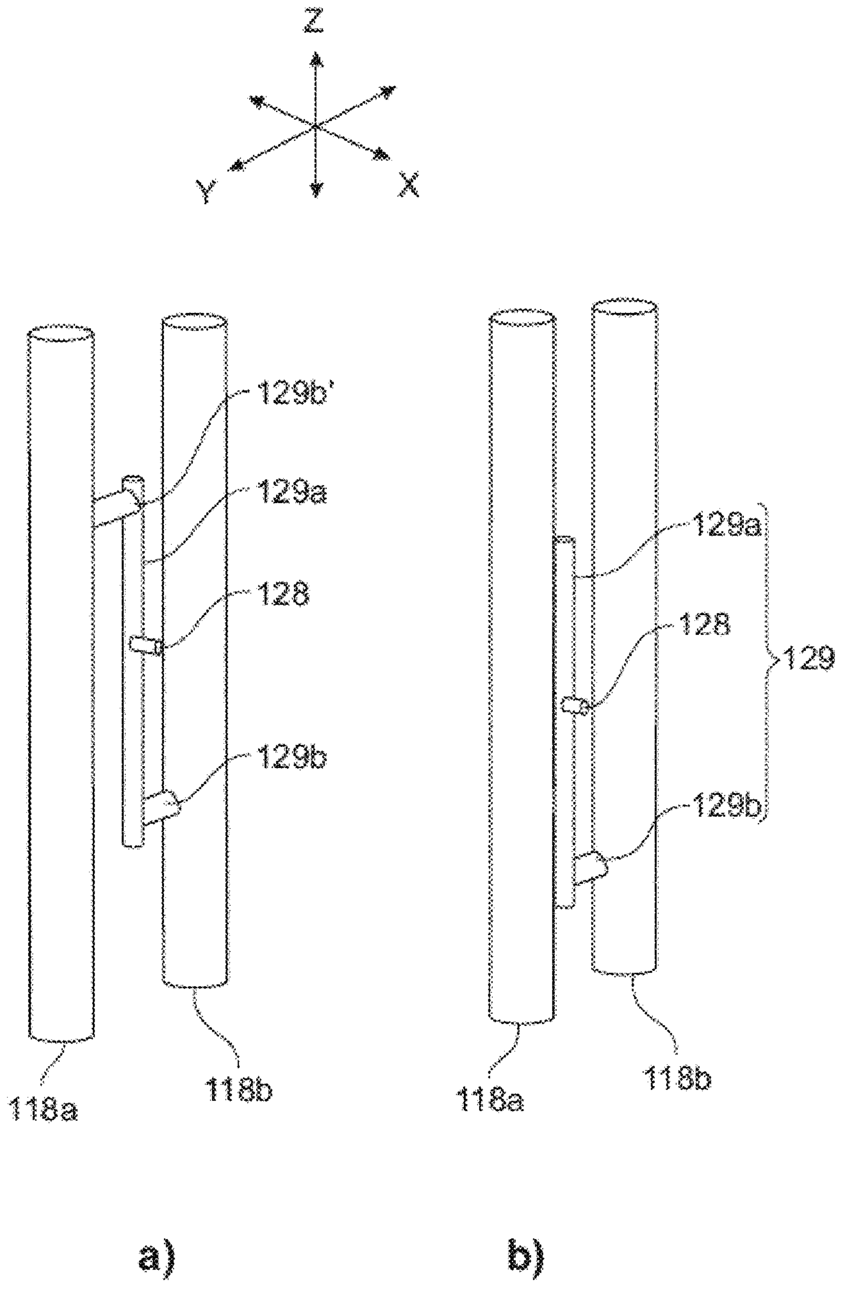

[Fig.7]
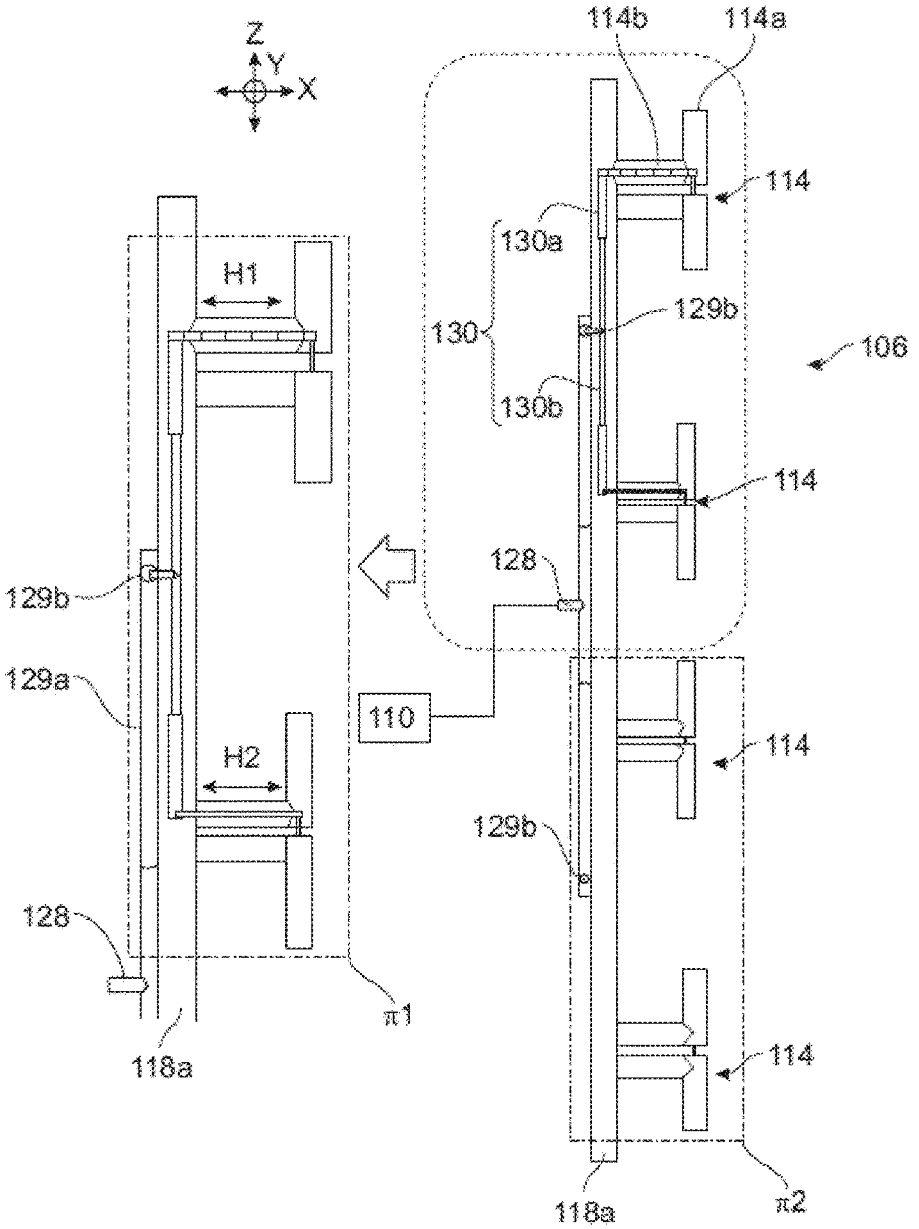

[Fig.8]
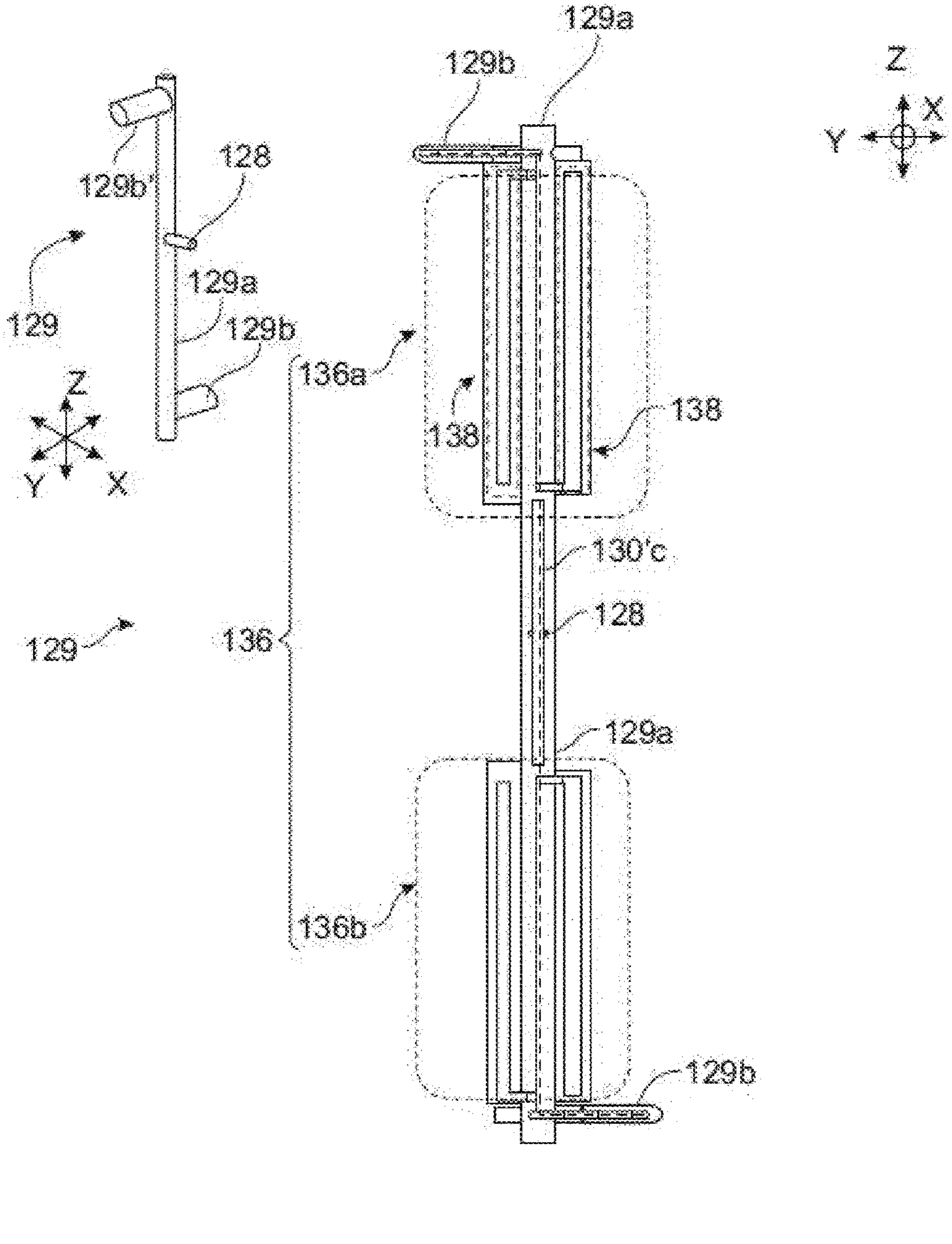

[Fig.9]
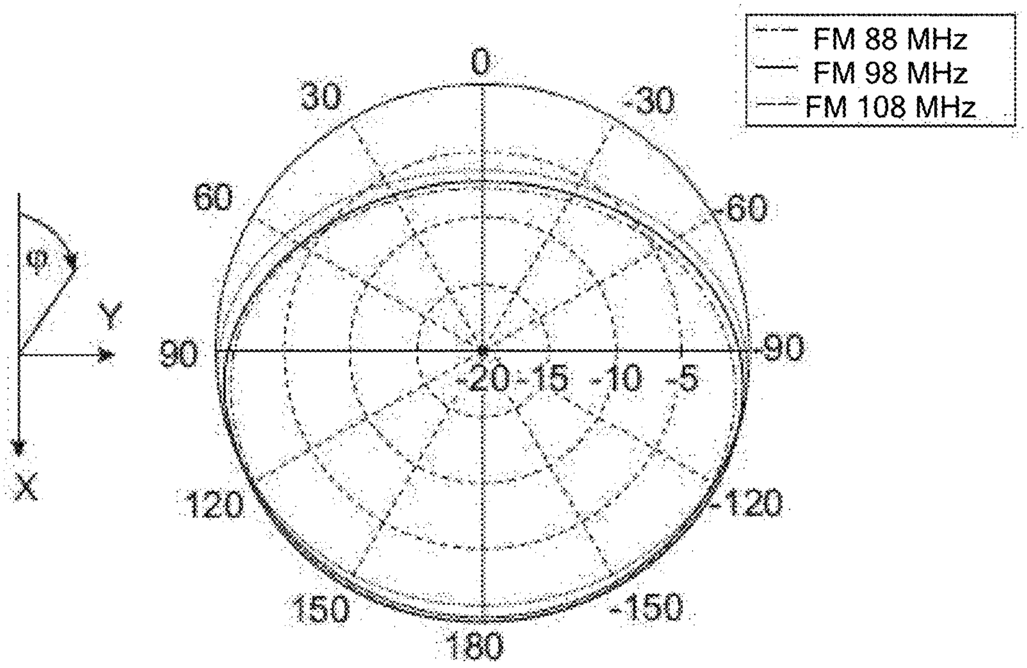

[Fig.10]
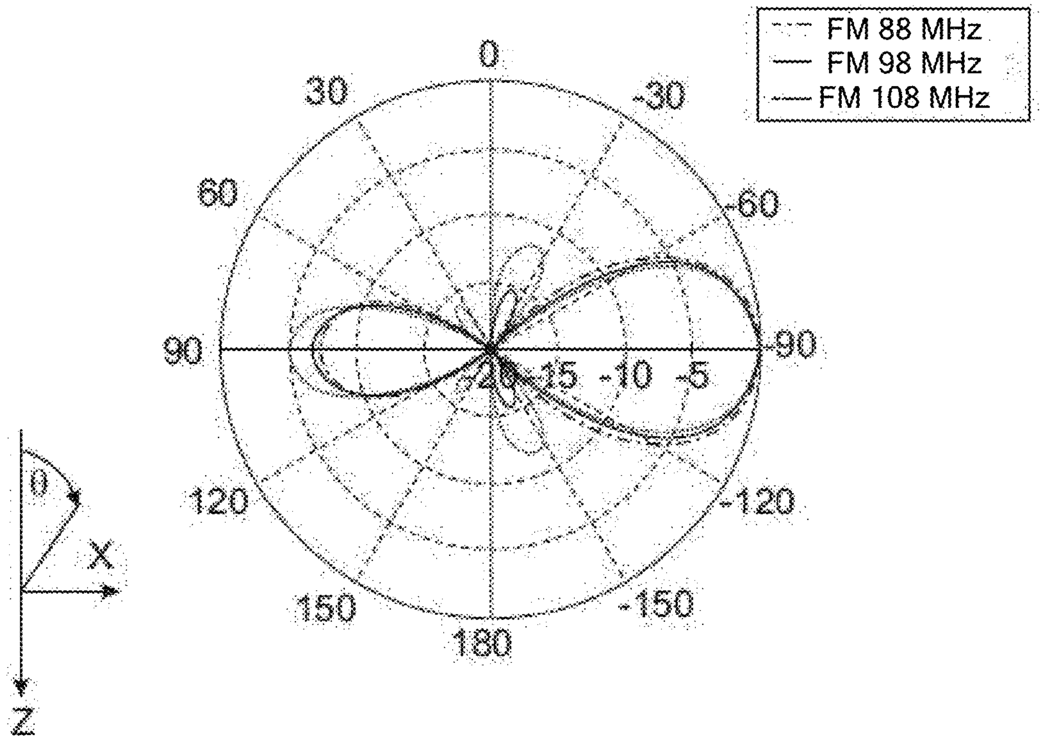

[Fig.11]
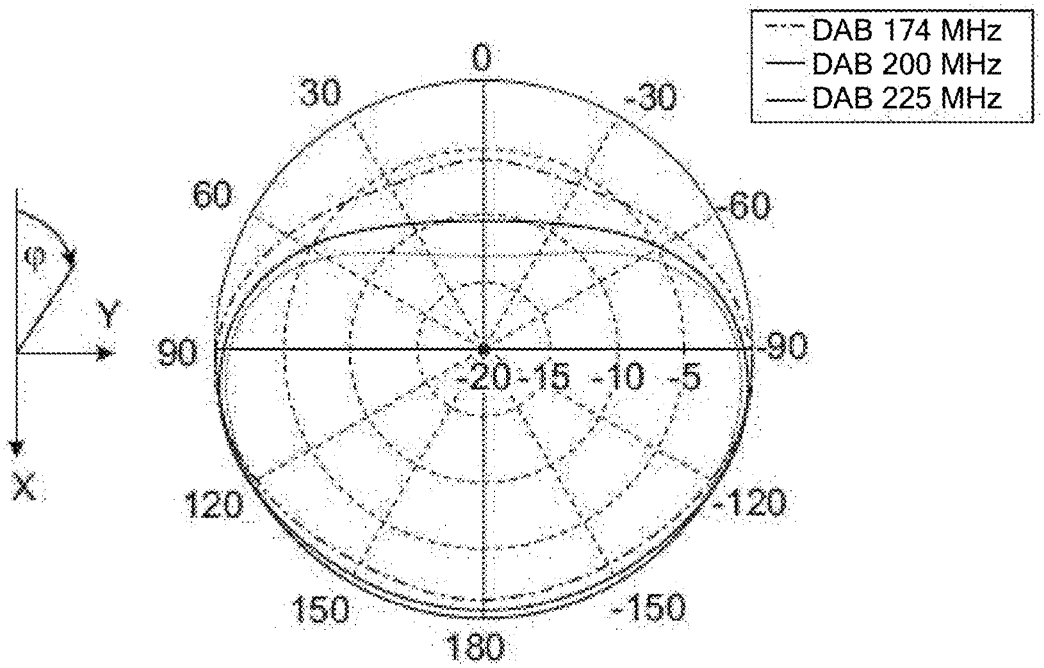

[Fig.12]
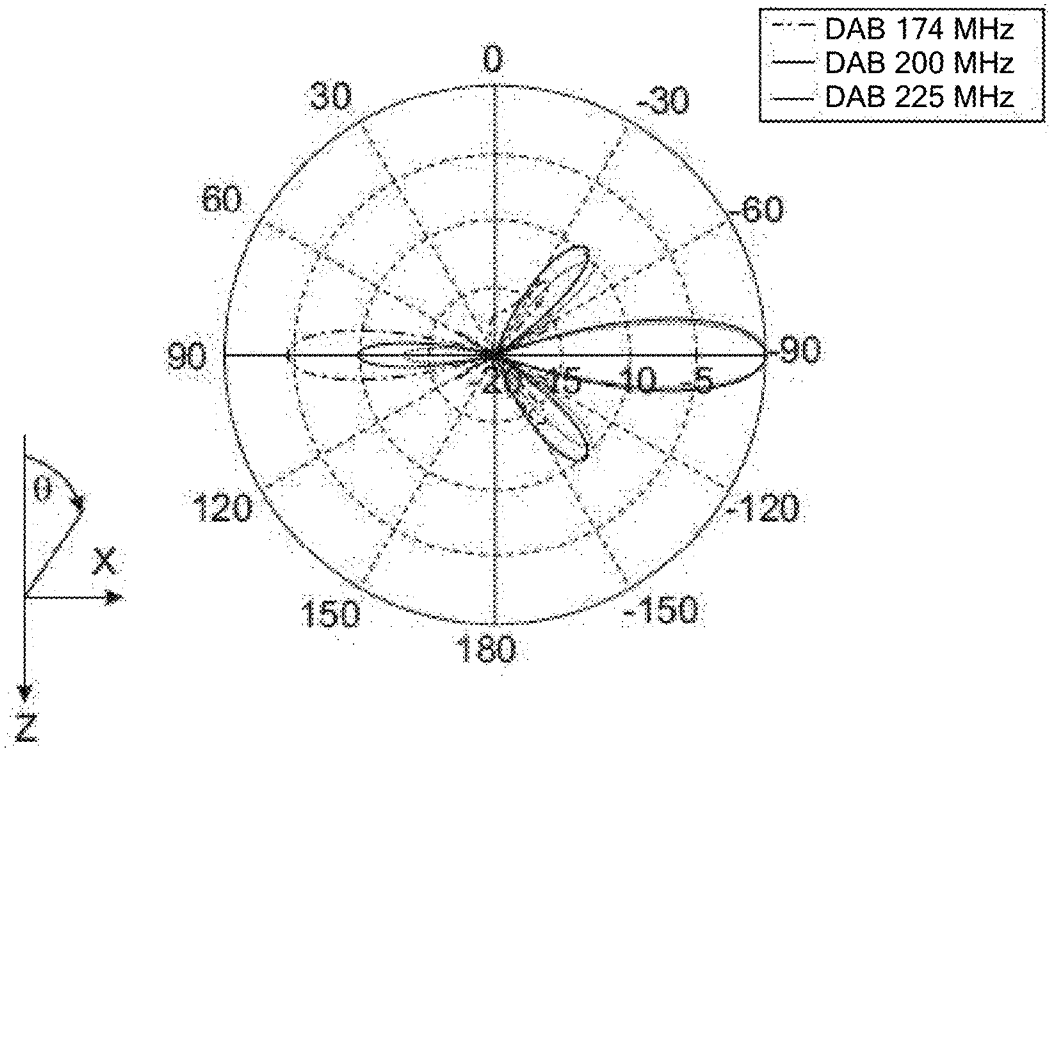

[Fig.13]
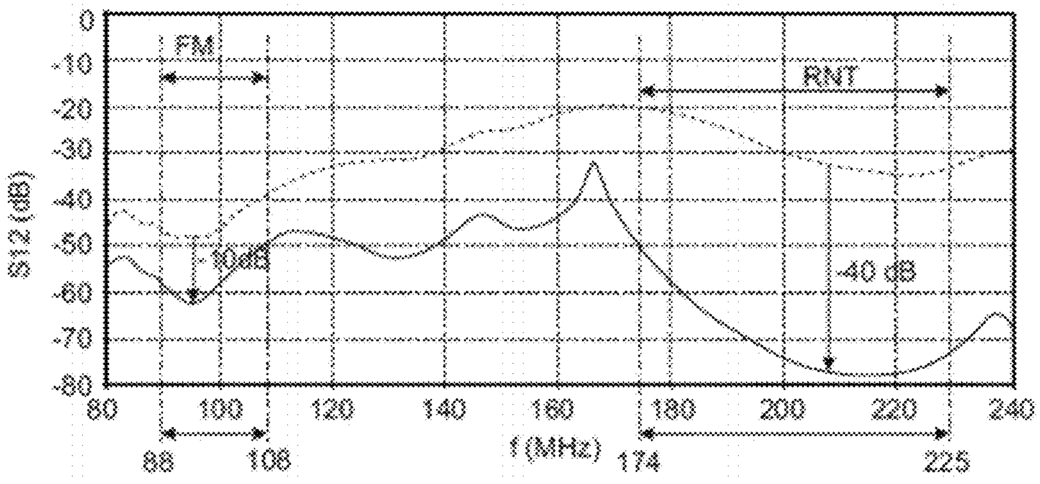

[Fig.14]
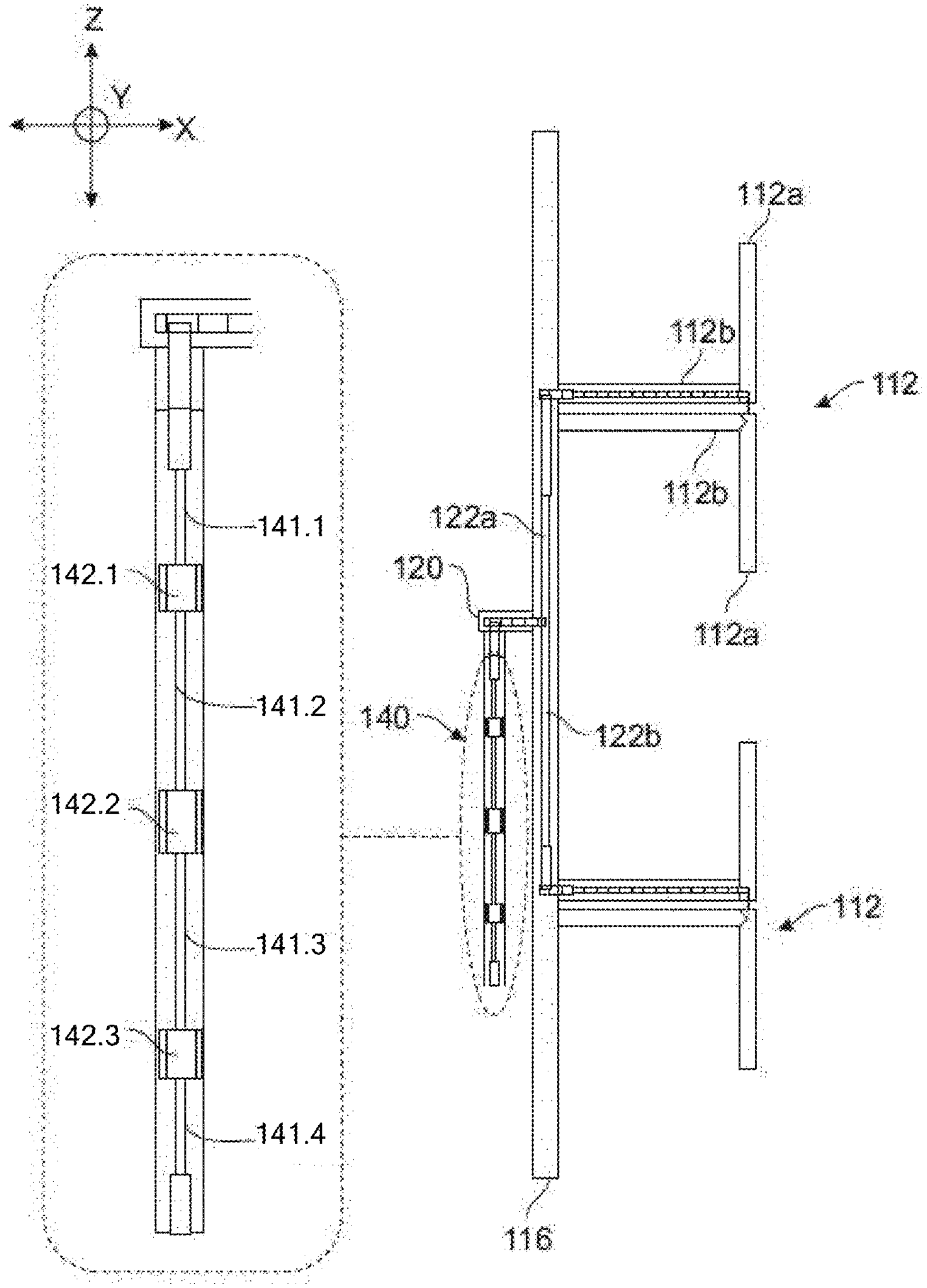

[Fig.15]
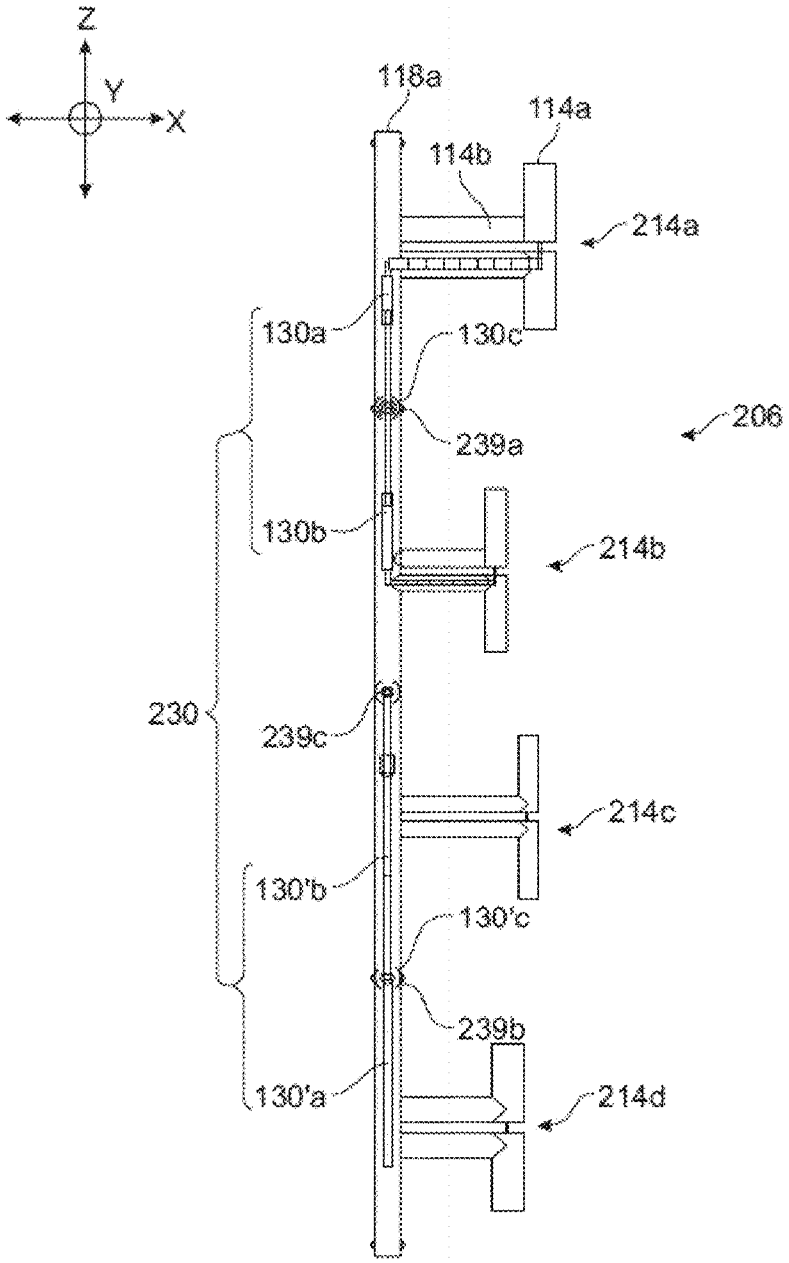

[Fig.16]
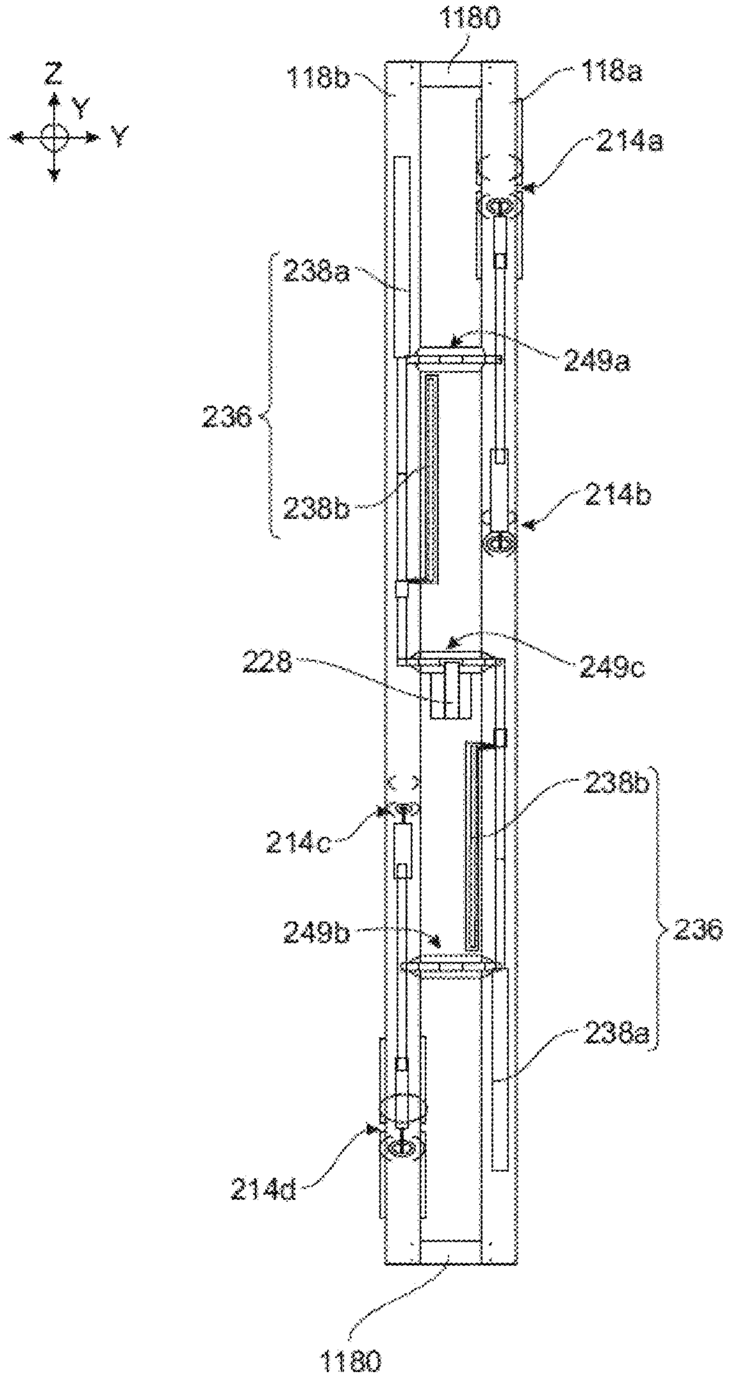

[Fig.17]
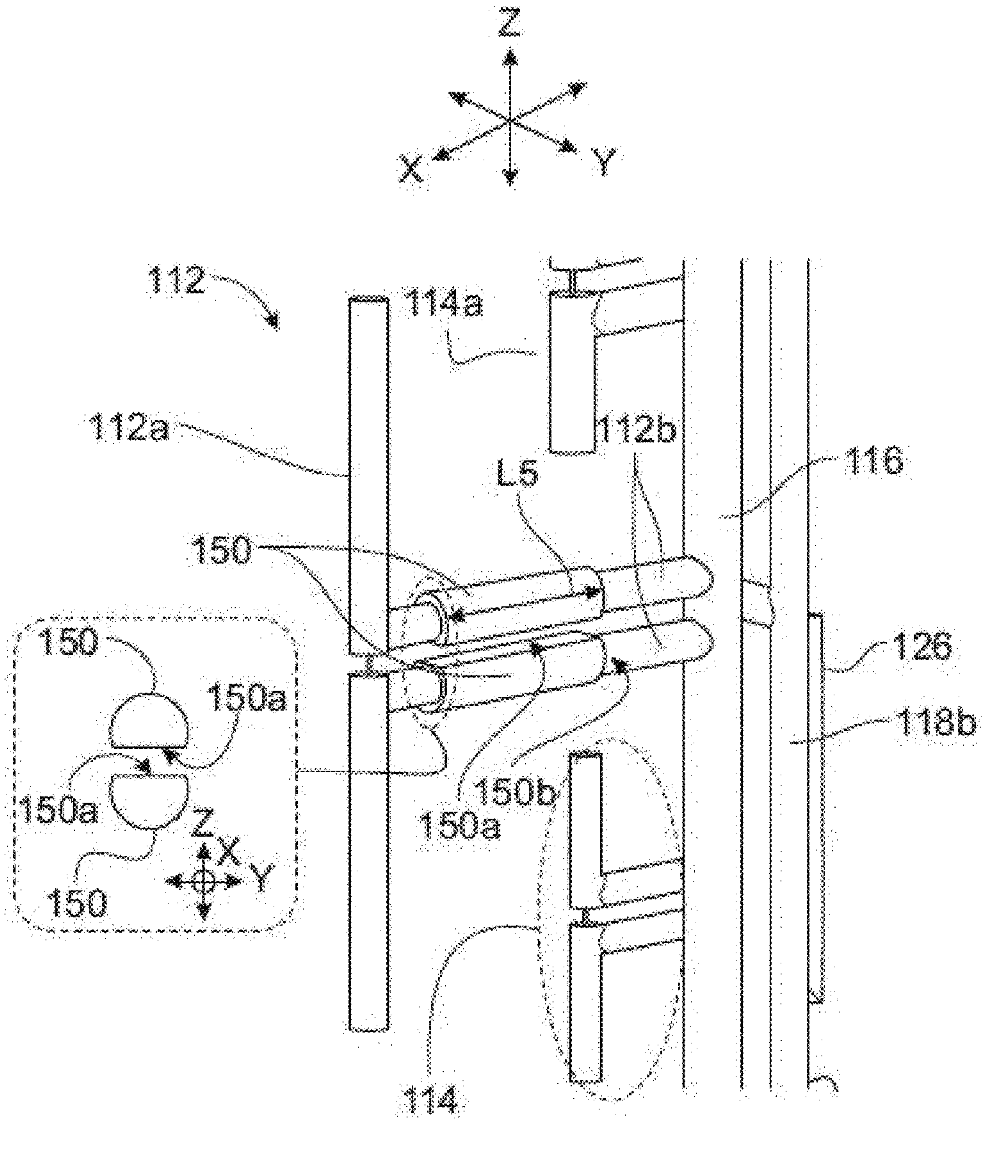

[Fig.18]
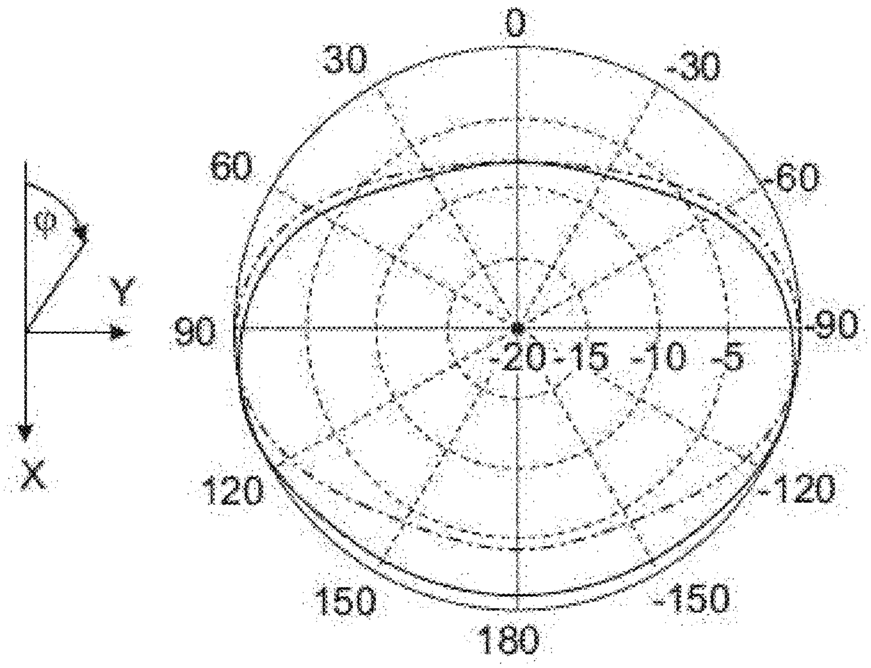

[Fig.19]
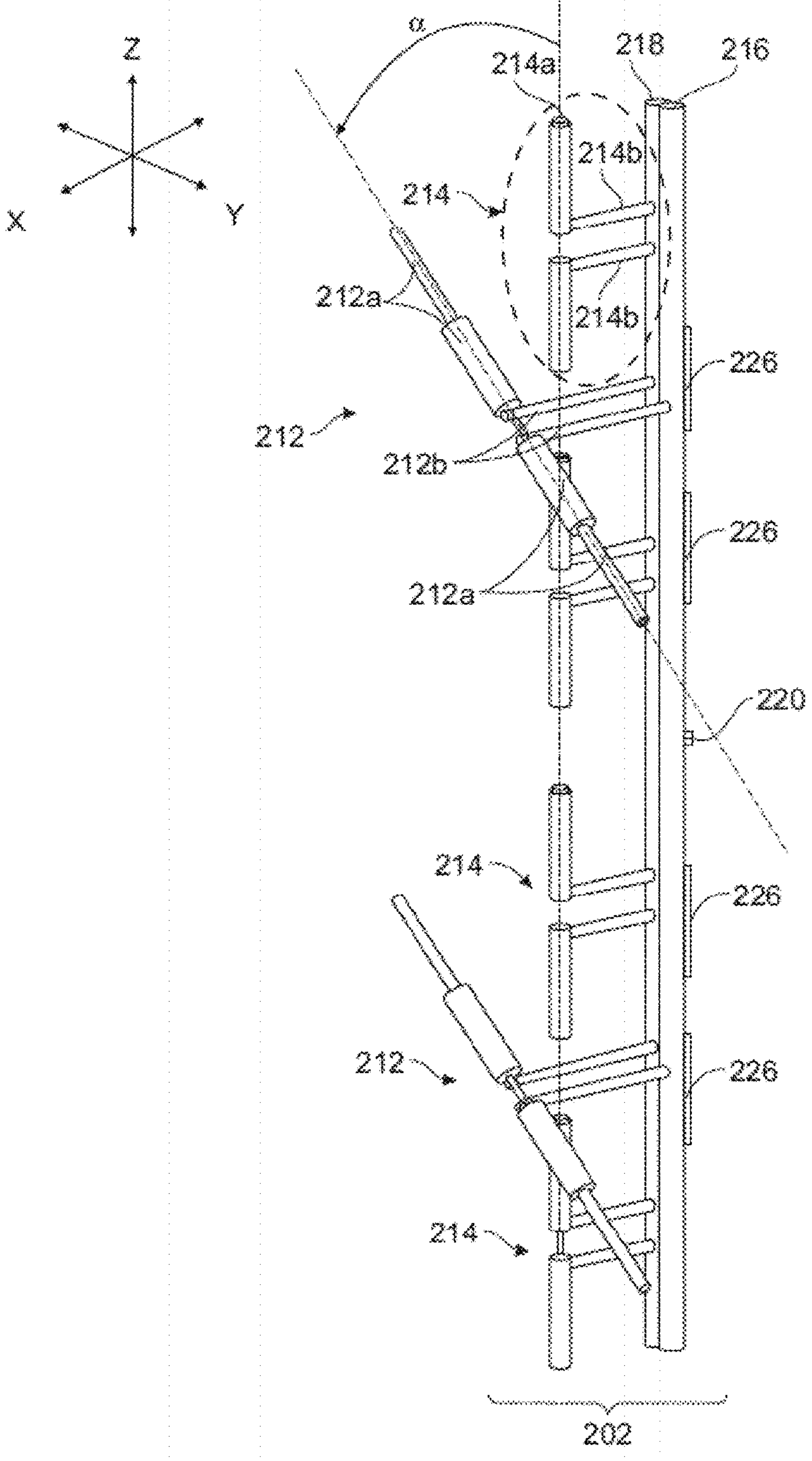

[Fig.20]
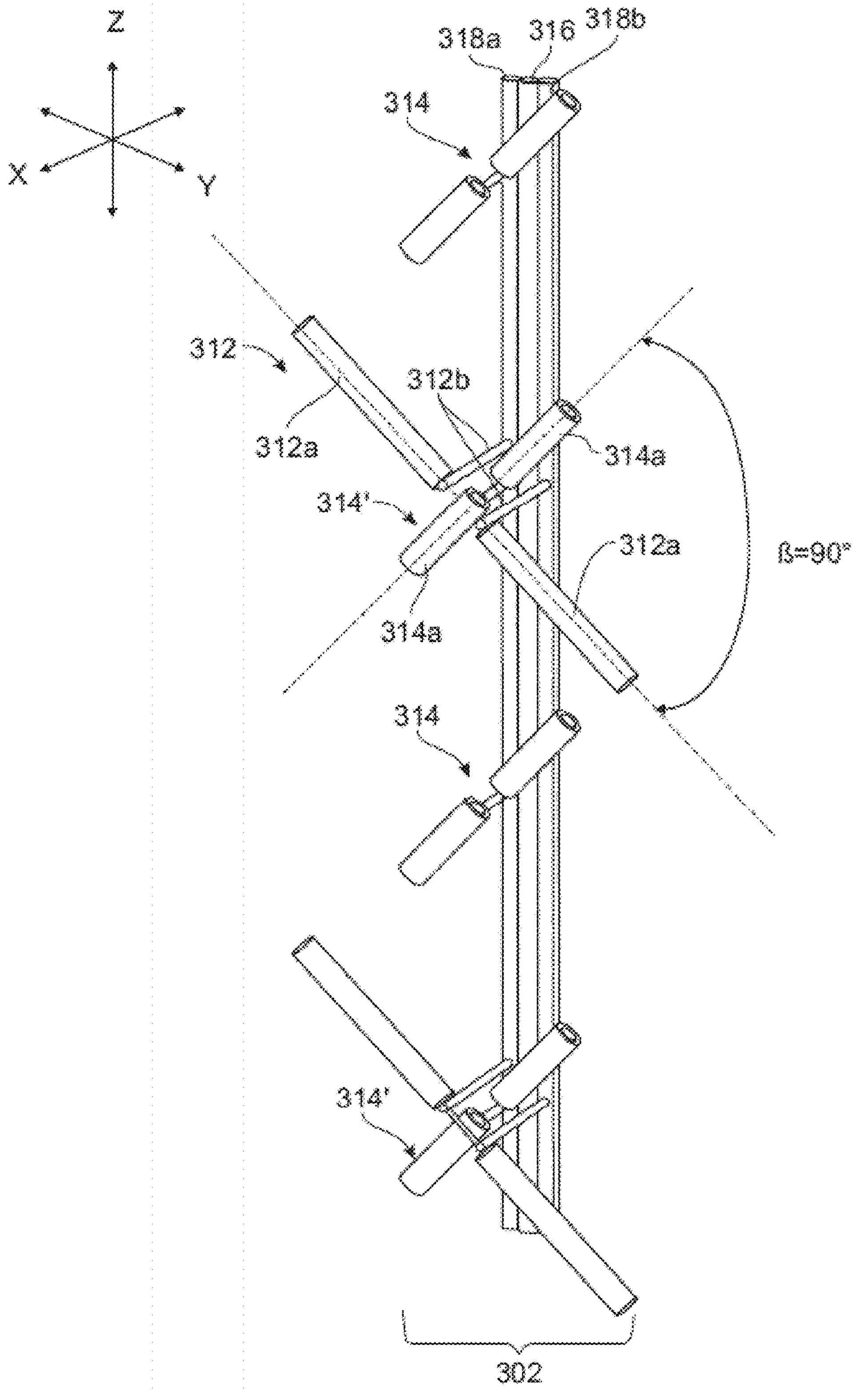

[Fig.21]
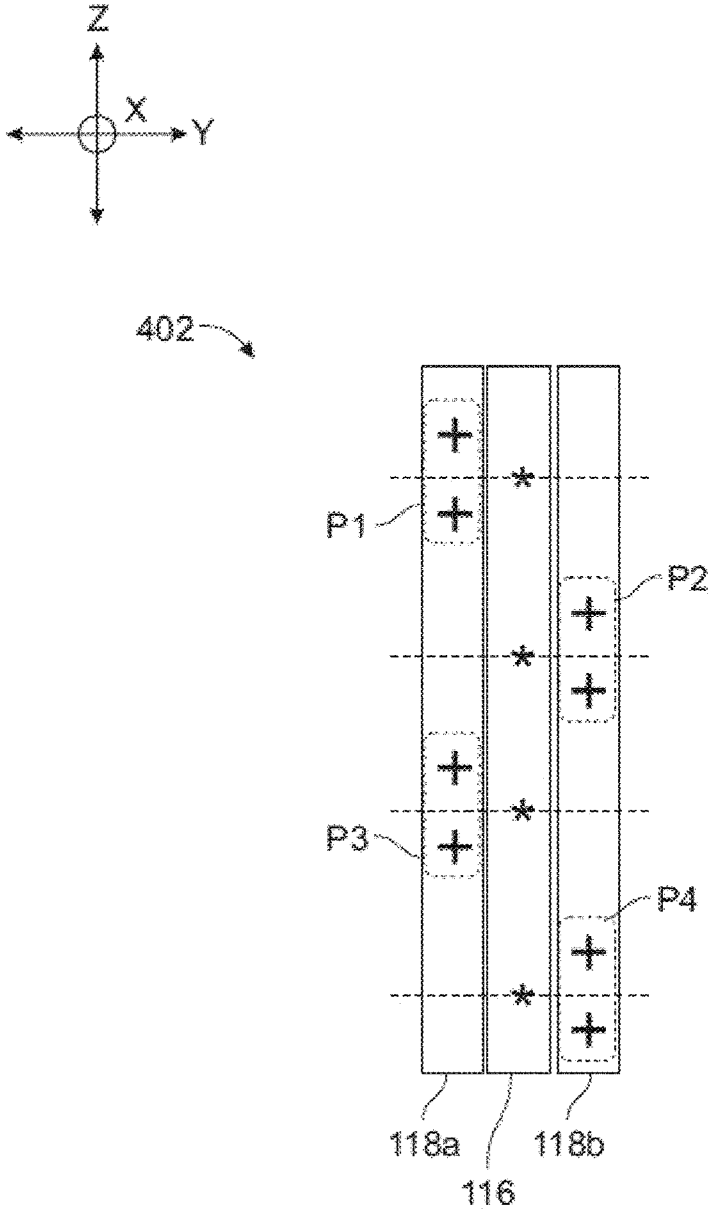

[Fig.22]
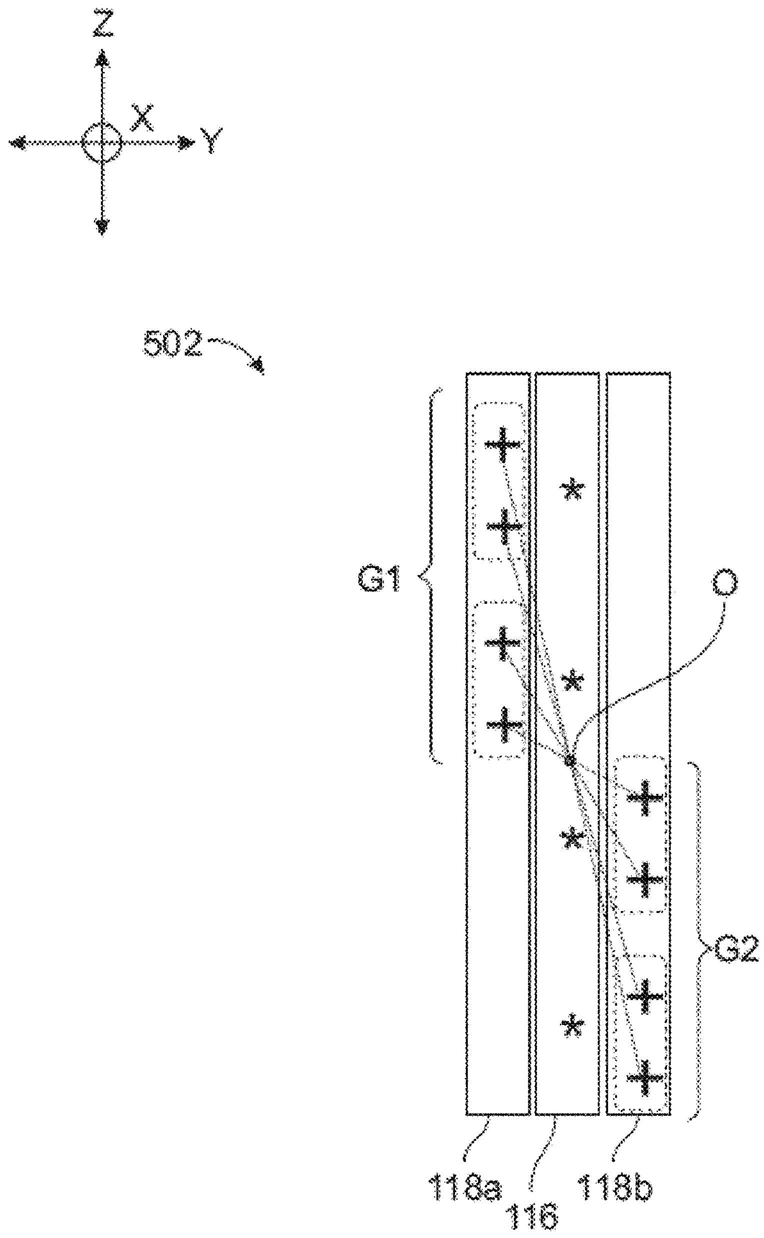

[Fig.23]
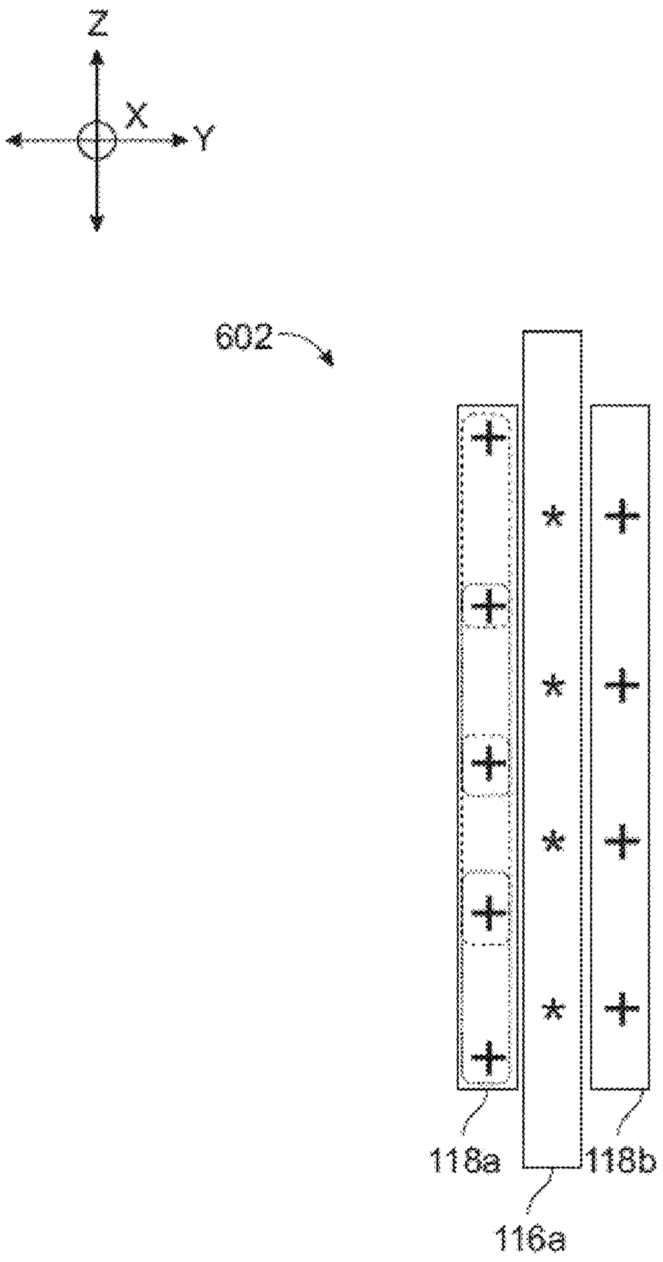

[Fig.24]
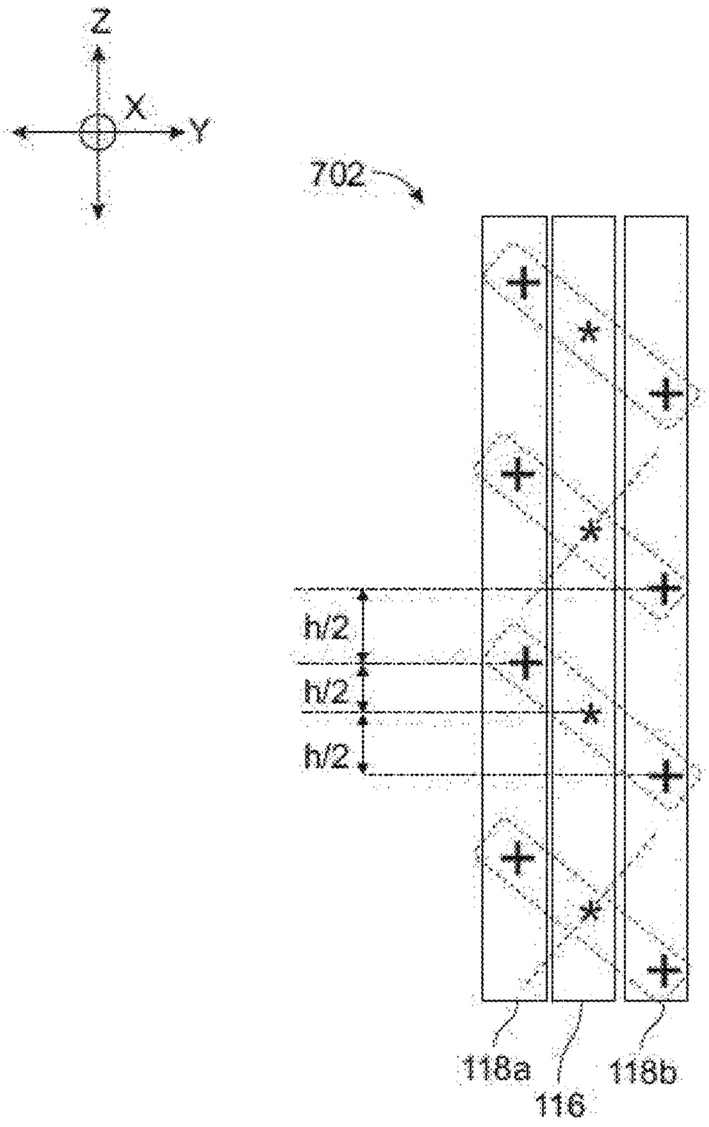

[Fig.25]
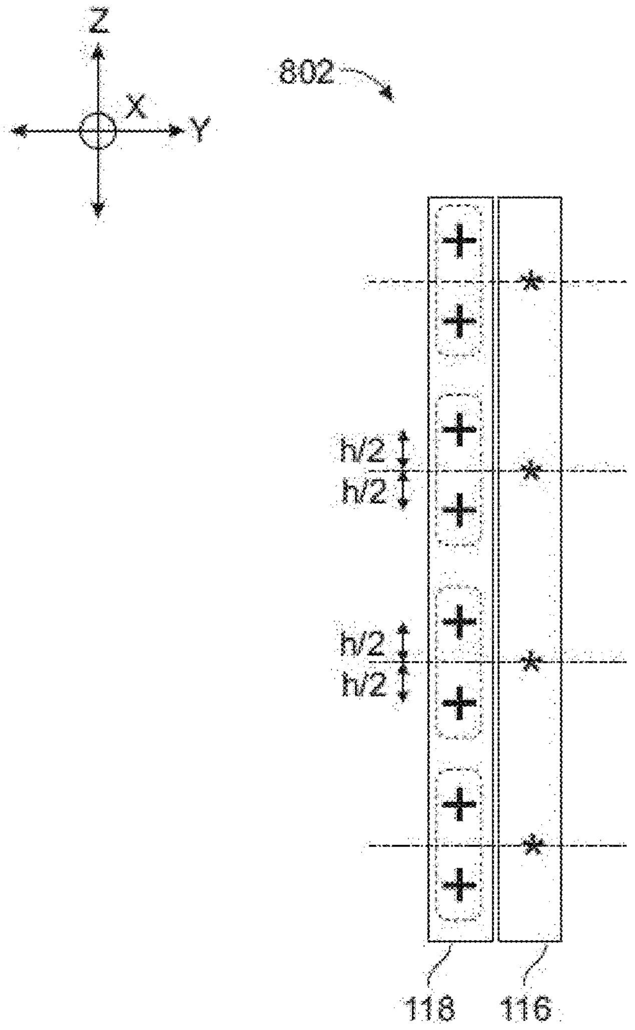

ANTENNA DEVICE WITH TWO DIPOLE ARRAYS AND ASSOCIATED COMMUNICATION SYSTEM

TECHNICAL FIELD OF THE INVENTION

The invention relates to an antenna device with two dipole arrays and an associated communication system.

The invention finds a preferred application for pooling, on the same radio infrastructure, two distinct services operating in different frequency bands, such as for example an FM (Frequency Modulation) broadcasting service and a digital terrestrial radio service, also referred to by the acronym DTR.

TECHNOLOGICAL BACKGROUND

Patent GB1247629 describes an antenna device with a high azimuthal aperture for broadcasting UHF (Ultra High Frequency) signals. This antenna device comprises an array of vertically aligned low-frequency dipoles and an array of high-frequency dipoles also vertically aligned. The antenna device also comprises a support for the dipoles, in the form of a vertical mast.

To limit coupling between arrays, patent GB1247629 proposes placing, along the mast, one array above the other. Because of this, the mast can reach a very high height, which can impose strong mechanical constraints to ensure stable and robust support of the mast.

The addition of low-frequency services on an existing pylon already hosting high-frequency services is particularly restrictive insofar as the low-frequency array must be positioned at the top of the pylon to preserve quasi-symmetrical radiation around the mast, while limiting interference with arrays already present on the mast.

Thus, the addition of a low-frequency array intended to, for example, provide an FM broadcasting service operating between 87.5 MHz and 108 MHZ, has the disadvantage of condemning the top of the pylon exclusively to this service, thus preventing the addition of a new service at a higher frequency, such as a digital terrestrial radio service operating for example between 174 MHz and 240 MHz.

Thus, it may be desired to provide an antenna device which makes it possible to overcome at least part of the aforementioned problems and constraints.

SUMMARY OF THE INVENTION

An antenna device is therefore proposed comprising: a low-frequency array of low-frequency dipoles having respective centers aligned on a so-called vertical axis; a high-frequency array of high-frequency dipoles having respective centers following each other vertically; and a support of the low-frequency dipoles and the high-frequency dipoles, wherein the high-frequency dipoles are arranged so that the center of each low-frequency dipole is positioned vertically between the centers of a pair of two high-frequency dipoles.

Thus, the high-frequency dipoles are vertically nested with the low-frequency dipoles, so as to limit the coupling between the high-frequency dipoles and the low-frequency dipoles, while reducing the height of the support.

The invention may further comprise one or more of the optional features that will be described below, in any technically possible combination.

The support comprises a main support, along which the low-frequency dipoles are vertically arranged. The support further comprises an auxiliary support, along which the high-frequency dipoles are vertically arranged. Preferably, the auxiliary support is attached to the main support.

The main support is a hollow, electrically conductive main mast. The antenna device further comprises a coaxial line comprising at least one inner conductor electrically connecting the low-frequency dipoles to the same input/output connector of the low-frequency array, such that the main mast constitutes a return line to a common electrical ground.

The antenna device further comprises on the main mast a device for decoupling the low-frequency dipoles from the high-frequency dipoles. The decoupling device is fixed on the main mast and connected to the inner conductor of the coaxial line of the low-frequency array.

The decoupling device is a coaxial low-pass filter arranged at the input of the low-frequency array. The filter consists of alternating high and low impedance coaxial sections.

The center of each low-frequency dipole is arranged vertically in the middle of the centers of the pair of high-frequency dipoles.

The centers of the high-frequency dipoles of each pair are vertically aligned.

The centers of the high-frequency dipoles of at least one pair of high-frequency dipoles are horizontally offset to one side of the centers of the low-frequency dipoles, while the centers of at least one other pair of high-frequency dipoles are horizontally offset to the other side of the low-frequency dipoles.

The pairs of high-frequency dipoles are arranged alternately on either side of the low-frequency dipoles.

The two pairs of high-frequency dipoles associated with two consecutive low-frequency dipoles are horizontally offset on the same side of the low-frequency dipoles.

The low-frequency dipoles and the high-frequency dipoles are inclined relative to each other.

At least one high-frequency dipole is arranged at the center of a low-frequency dipole.

The low-frequency dipoles and/or the high-frequency dipoles comprise two co-linear arms of the same length, preferably equal to a quarter of the wavelength associated with an operating frequency of said respective array.

The auxiliary support comprises at least one hollow and electrically conductive auxiliary mast. The antenna device further comprises a coaxial line comprising at least one inner conductor running inside said at least one auxiliary mast and electrically connecting the high-frequency dipoles to the same input/output connector of the high-frequency array, so that said at least one mast constitutes a return line to a common electrical ground.

The antenna device further comprises a device for decoupling the high-frequency dipoles from the low-frequency dipoles, said decoupling device being connected to the inner conductor of the coaxial line of the low-frequency array.

The decoupling device comprises one or more frequency rejection filters.

The antenna device further comprises, for each low-frequency dipole, at least one quarter-wave trap arranged around a leg of the low-frequency dipole.

The leg of the low-frequency dipole comprises two fixing tubes parallel to each other, the quarter-wave trap comprising two hollow cylindrical bodies, longitudinally truncated so as to each have a flat surface. The two cylindrical bodies are arranged respectively around each of the two fixing tubes, so that the flat surfaces of the two cylindrical bodies are opposite each other.

Another object of the invention is a communication system configured to transmit and/or receive radiofrequency signals, in at least two distinct frequency bands. The communication system is characterized in that it comprises an antenna device according to the invention, as described above.

BRIEF DESCRIPTION OF THE FIGURES

The invention will be better understood with the aid of the following description, given solely by way of example and with reference to the appended drawings, in which:

FIG. 1 is a perspective view of a communication system including an antenna device according to a first embodiment of the invention;

FIG. 2 is a schematic top view of the antenna device according to FIG. 1;

FIG. 3 schematically illustrates a front view of the arrangement of the high-frequency dipoles relative to the low-frequency dipoles of the antenna device according to FIG. 1;

FIG. 4 is a side sectional view of the low frequency array of the antenna device according to FIG. 1;

FIG. 5 is a schematic perspective view of the high-frequency array of the antenna device according to FIG. 1;

FIG. 6 schematically illustrates in perspective two variants of the arrangement of the support of the high-frequency array of the antenna device according to FIG. 1;

FIG. 7 is a side sectional view of the high-frequency array of the antenna device according to FIG. 1;

FIG. 8 is a cross-sectional view of a decoupling connecting part of the high-frequency array of the antenna device according to FIG. 1;

FIG. 9 illustrates azimuthal radiation patterns of the low-frequency array of the antenna device according to FIG. 1;

FIG. 10 illustrates elevation radiation patterns of the low-frequency array of the antenna device according to FIG. 1;

FIG. 11 illustrates azimuthal radiation patterns of the high-frequency array of the antenna device according to FIG. 1;

FIG. 12 illustrates elevation radiation patterns of the high-frequency array of the antenna device according to FIG. 1;

FIG. 13 illustrates the transmission parameter S12 of the antenna device according to FIG. 1 with and without decoupling devices;

FIG. 14 is a longitudinal sectional view of the low-frequency array of the antenna device according to FIG. 1 illustrating an alternative embodiment of the decoupling device;

FIG. 15 is a longitudinal sectional view of the high-frequency array of the antenna device according to FIG. 1 illustrating an alternative embodiment for the connection of the dipoles;

FIG. 16 is a cross-sectional view of the high-frequency array of FIG. 15;

FIG. 17 is a perspective view of an alternative embodiment of the antenna device according to FIG. 1 illustrating quarter-wave traps on the low-frequency array;

FIG. 18 illustrates azimuthal radiation patterns of the high-frequency array of the antenna device according to FIG. 17, with and without quarter-wave traps;

FIG. 19 illustrates in perspective an antenna device according to a second embodiment of the invention;

FIG. 20 illustrates in perspective an antenna device according to a third embodiment of the invention;

FIG. 21 schematically illustrates an arrangement of the dipoles according to a first variant embodiment of the antenna device according to FIG. 1;

FIG. 22 schematically illustrates an arrangement of the dipoles according to a second variant embodiment of the antenna device according to FIG. 1;

FIG. 23 schematically illustrates an arrangement of the dipoles according to a third variant embodiment of the antenna device according to FIG. 1;

FIG. 24 schematically illustrates an arrangement of the dipoles according to a fourth variant embodiment of the antenna device according to FIG. 1; and FIG. 25 schematically illustrates an arrangement of the dipoles according to an alternative embodiment of the antenna device according to FIG. 19.

DETAILED DESCRIPTION OF THE INVENTION

In the description that follows, as well as in the claims, the terms of relative position of the elements described will be taken with respect to an orthogonal reference frame (X, Y, Z) comprising a so-called vertical direction Z, a so-called right/left direction Y and a so-called front/back direction X. In particular, the terms vertical and vertically will refer to the vertical direction Z as shown in the Figures. Furthermore, the vertical direction Z is in particular intended to correspond to the usual vertical.

With reference to FIG. 1, an example of a communication system 100 implementing the invention will now be described.

This communication system 100 is configured to transmit and/or receive at the same time two radiofrequency signals from two distinct respective services. For example, one of the services is an FM (Frequency Modulation) broadcasting service and the other is a digital terrestrial radio service (also known as DAB, or Digital Audio Broadcasting).

The two services operate respectively in a first frequency band and a second frequency band, higher than the first frequency band. Thus, the first frequency band is called the low-frequency band, while the second frequency band is called the high-frequency band. The low-frequency band is for example included in the metric frequency range, i.e. between 30 and 300 MHz. Furthermore, the high-frequency band is, for example, included in the decimetric frequency range, i.e. between 300 and 3000 MHz.

Generally speaking, low frequency and high frequency do not necessarily belong to distinct frequency domains (i.e. metric, decimetric, etc.). For example, the low frequency is an FM frequency (e.g. 88, 98 or 108 MHZ) and the high frequency is a DAB frequency (e.g. 174, 200 or 225 MHZ), in which case the low and high frequencies both belong to the same metric frequency domain.

The communication system 100 thus comprises an antenna device 102 grouping:

- for the first service, a low-frequency array 104 of low-frequency dipoles 112 and a transmitter/receiver 108, and
- for the second service, a high-frequency array 106 of high-frequency dipoles 114 and a transmitter/receiver 110.

Each dipole array is designed to transmit and/or receive in a frequency band centered around a so-called central frequency. Subsequently, it will be considered that this central frequency is the operating frequency of the dipole array, in transmission or in reception.

In transmission mode, each transmitter/receiver 108, 110 is designed to convert data to be transmitted from the associated service into a radiofrequency signal supplied to the dipoles 112, 114 of the associated array 104, 106. These dipoles 112, 114 are then designed to emit the radiofrequency signal in free space.

In reception mode, the dipoles 112, 114 of each array 104, 106 are designed to capture a free-space radiofrequency signal received from the service in question for the associated transmitter/receiver 108, 110. The latter is then designed to convert this received radiofrequency signal into data received for the service considered.

Each dipole 112, 114 is an elementary antenna designed, when isolated, to emit and/or receive electromagnetic waves according to an omnidirectional radiation pattern, that is to say having a quasi-constant gain (i.e. to within 3 dB) in a horizontal plane (i.e. in all directions perpendicular to the Z axis) called azimuthal.

Structurally, each dipole 112, 114 comprises two electrically conductive arms 112*a*, 114*a*. Preferably, the arms 112*a*, 114*a* of the same dipole 112, 114 are identical, in particular of the same length and co-linear. Thus, the two arms of each dipole have the same current density to limit the electromagnetic radiation instabilities of the dipole.

The arms 112*a*, 114*a* of the dipoles 112, 114 thus have two respective ends facing each other, called central ends, separated by a gap having a midpoint. This midpoint constitutes a center 112*c*, 114*c* of the dipole 112, 114. The arms 112*a*, 114*a* of the dipoles 112, 114 have a length between $\lambda/8$ and $\lambda/2$, where $\lambda$ designates the reference wavelength associated with the central frequency of the frequency band used for the service concerned.

Preferably, the arms 112*a* of the low-frequency dipoles 112 are longer than the arms 114*a* of the high-frequency dipoles 114. In a known manner, the greater the length of the arms of the dipole, the more the dipole is adapted to radiate at low frequency.

In the example of FIG. 1, the arms 112*a*, 114*a* of the low-frequency 112 and high-frequency 114 dipoles are all vertical. This orientation allows the two arrays 104, 106 to emit and receive vertically polarized waves.

Each dipole 112, 114 further comprises a leg 112*b*, 114*b* for fixing the two arms 112*a*, 114*a*. The leg 112*b*, 114*b* is for example attached to the central ends of the two arms 112*a*, 114*a*. The leg 112*b*, 114*b* may be single or double in that it is made up of one or two hollow tubes respectively. The tubes may be of any cross-section, for example square, rectangular, circular or oval. In the case of a double leg, the two tubes are respectively fixed to the central ends of the arms 112*a*, 114*a*.

In all the embodiments described in the present application, each dipole 112, 114 has a double leg. However, according to other embodiments not described, each dipole may have a single leg, in particular the low-frequency dipoles and/or the high-frequency dipoles.

The length of the arms 112*a*, 114*a* and, more generally, the overall dimensions of the dipoles 112, 114 such as the thickness of the tubes of the leg, the length of the leg, may be adapted to achieve the desired radiation and impedance matching, taking into account the mutual couplings between the different constituent elements of the antenna device 102. Furthermore, not all dipoles in the same array will necessarily be identical.

In general, the arms of each dipole are co-linear and each have a free end. This means that this free end is not connected to any other element. For example, the free end of the arms of each dipole is not connected to the dipole support. Thus, a dipole is clearly distinguished from a batwing or Schmetterling (in German) type of antenna, consisting of two M-shaped arms, as described in document U.S. Pat. No. 5,497,166. Unlike the dipole, each M-shaped arm of such an antenna does not have any free ends, as is the case, for example, with a T-shaped dipole where only the leg of the T is fixed to the support.

In the example of FIG. 1, the low-frequency array 104 comprises two low-frequency dipoles 112. In other embodiments, they could be more numerous.

The centers 112*c* of the low-frequency dipoles 112 are aligned along the same vertical axis A1. By "aligned" is meant that the low-frequency dipoles 112 are substantially aligned along a vertical line, that is to say that their centers 112*c* can be offset horizontally relative to the vertical axis A1, for example at less than one fifteenth of the reference wavelength associated with the low-frequency array 104 as previously defined.

For example, in the case where the low-frequency array 104 operates at a frequency $f_1$ equal to 100 MHz in an FM band, the associated reference wavelength $\Delta_1$ is equal to 3 m ($\lambda_1=C/f_1$, where $c=3.10^8$ m/s). In this case, it is considered that the low-frequency dipoles 112 are vertically aligned if they do not deviate by more than $\lambda_1/15=0.2$ m perpendicular to the axis A1.

Still in the example of FIG. 1, the high-frequency array 106 comprises four high-frequency dipoles 114. In other embodiments, the number of high-frequency dipoles may be adjusted in particular as a function of the number of low-frequency dipoles, so that each low-frequency dipole is positioned vertically between the centers of a pair of two high-frequency dipoles.

A first pair of high-frequency dipoles 114 (called the upper pair) is fixed on an upper portion of an auxiliary mast 118*a*, while a second pair of high-frequency dipoles 114 (called the lower pair) is fixed on a lower portion of another auxiliary mast 118*b*.

According to a feature of the invention, the centers 114*c* of the dipoles of the lower pair are offset horizontally to the left of the centers 112*c* of the low-frequency dipoles 112, while the centers 114*c* of the lower pair of high-frequency dipoles 114 are offset horizontally to the right of the low-frequency dipoles 112.

As illustrated in FIG. 1, the high-frequency dipoles 114 located at the ends of the respective masts (called extreme dipoles) have larger dimensions than the other high-frequency dipoles (called central dipoles). In particular, each extremal dipole has a leg of length greater than that of the central dipole, so for each of the two pairs, the arms of the extremal and central dipoles are not co-linear, i.e. all the arms are not aligned along the same straight line, but are included in the same vertical plane.

According to a feature of the invention, the centers 114*c* of the high-frequency dipoles 114 of each pair are aligned vertically, so that all the pairs of centers are aligned in the same direction, parallel to the vertical axis Z.

Thus, the dipoles of the upper pair have a vertical plane of symmetry called upper, while the dipoles of the lower pair have a vertical plane of symmetry called lower. The dipoles of the upper pair are therefore aligned along the upper vertical plane (not shown), while the dipoles of the lower pair are aligned along the lower vertical plane $\pi$. As illustrated, the legs of the dipoles of the lower pair are included in the lower vertical plane π. In order not to make FIG. 1 too cumbersome, only the lower vertical plane IT has been shown for the high-frequency dipoles 114 of the lower pair.

This configuration allows to correct the edge effects at the ends of the high-frequency array, which has the effect of improving the radiation pattern of the array (e.g. symmetrization in the azimuthal plane, and/or reductions in radiation attenuation) as well as the overall impedance adaptation of the array by playing on the mutual impedances.

In other embodiments, the extreme dipoles may be colinear with the central dipoles, so as to significantly simplify the manufacture of the array from a mechanical point of view in particular.

In other embodiments, the high-frequency dipoles 114 could of course be more numerous, for example depending on the number of low-frequency dipoles 112.

In all cases, the high-frequency dipoles 114 are nested vertically with the low-frequency dipoles 112, in order to limit the height of the antenna device 102 while ensuring decoupling between the two arrays.

To support the dipoles 112, 114, the antenna device 102 further comprises a support 115 to which the dipoles 112, 114 are fixed by their respective legs 112*b*, 114*b*.

The support 115 comprises, for example, a vertical main mast 116 carrying the low-frequency dipoles 112 and at least one vertical auxiliary mast 118*a*, 118*b* carrying the high-frequency dipoles 114. In the example of FIG. 1, two auxiliary masts 118*a*, 118*b* are provided to carry all of the high-frequency dipoles 114 on either side of the main mast 116.

Preferably, the auxiliary mast(s) 118*a*, 118*b* are attached to the main mast 116. Thus, to deploy an additional service, the high-frequency array 106 can be easily added to the low-frequency array 104 previously deployed. Conversely, the main mast 116 could be attached to the auxiliary mast(s) to add the low-frequency array 104 to the high-frequency array 106 previously deployed.

For example, in the case of two auxiliary masts 118*a*, 118*b*, the support comprises at least one crosspiece 1180 interposed between the two auxiliary masts 118*a*, 118*b*, each crosspiece being attached and fixed to the main mast 116. In the example illustrated in FIG. 1, three crosspieces 1180 horizontally connect the two auxiliary masts 118*a*, 118*b* at their ends along the Y axis. A third central crosspiece (not visible in FIG. 1) is preferably arranged equidistant from the two other crosspieces 1180 so as to reinforce the support of the two auxiliary masts 118*a*, 118*b*.

The support 115 is, for example, of hollow tubular structure and circular section, as illustrated in FIG. 1. However, in other embodiments, this section may of course take other shapes, such as a square, rectangular, triangular, oval or elliptical shape.

Generally speaking, the support 115 is of multi-tubular structure in the sense that it comprises at least two tubular longitudinal parts (i.e. masts) of any section, preferably rounded, such as circular or oval.

Thus, the support 115 is not a planar reflector, unlike the case of sector antennas typically used in mobile radio arrays whose azimuthal aperture at −3 dB is generally limited to 120° precisely because of the presence of a reflector plane.

In the context of the present invention, each dipole array is defined as a set of interconnected dipoles contributing to the same radiation pattern. For example, the dipoles of the same array are all driven jointly to form a radiation pattern of the array. This definition naturally excludes any sub-array, i.e. any portion of the same array grouping a subset of dipoles of this array.

Therefore, the support 115 is designed so that, on the one hand, all the low-frequency dipoles of the low-frequency array and, on the other hand, all the high-frequency dipoles of the high-frequency array respectively contribute to forming a radiation pattern in their respective frequency band having an azimuthal opening at −3 dB of at least 180°, in particular with radiation towards the rear of the support 115 in the direction X.

The main mast 116 is designed to be fixed vertically relative to the ground, directly or indirectly, for example by being fixed to a building or preferably to a pylon (standard use case). The main mast 116 is sized to withstand mechanical stresses imposed by the structure of the communications system.

FIG. 2 schematically illustrates the antenna device 102 seen from above, i.e. in the (X,Y) plane so as to visualize in particular the size of the support 115 which comprises the main mast 116 and the two auxiliary masts 118*a*, 118*b*.

The support 115 is sized so as to limit deformations of the radiation of the high-frequency dipoles 114 and of the radiation of the low-frequency dipoles 112. Thus, low-frequency radiation and high-frequency radiation can remain quasi-constant around the A1 axis.

For example, the support 115 has a horizontal angular size E around the axis A1 of less than 20°, preferably equal to 15°. In other words, the support 115 obscures the low-frequency dipoles 112 by at most 20° horizontally.

This angular bulk E has a bisector A2. The front-rear direction X is taken along this bisector A2. Thus, the support 115 is located, in the direction X, at the rear of the low-frequency dipoles 112, as well as at the rear of the high-frequency dipoles 114.

Generally, the support 115 has a sufficiently small footprint to allow each of the arrays to have a radiation pattern presenting an azimuthal opening at −3 dB of at least 180°.

In particular, the support 115 has a width that is sufficiently small to limit the masking of the radiation from the dipoles. Preferably, the main mast 116 has a diameter D1 less than 10%, preferably 5%, of the central operating wavelength of the low-frequency array 104. Similarly, the auxiliary masts 118*a*, 118*b* have a diameter D2 less than 10% of the central operating wavelength of the high-frequency array 106.

For example, in the case of an DTR service, the central operating wavelength of the high-frequency array (i.e. corresponding to a central frequency of 200 MHz) is less than 1.5 m, so that the diameter of each of the auxiliary masts 118*a*, 118*b* is less than 15 cm. In the case of an FM service, the operating wavelength of the low-frequency array (i.e. corresponding to a central frequency of 100 MHZ) is less than 3 m, so that the diameter of the main mast 116 is less than 30 cm. Thus, the support 115 has a width L defining the size of the support in the Y direction approximately equal to the sum of the diameter D1 of the main mast 116 and the diameters D2 of the auxiliary masts 118*a*, 118*b*, i.e. D1+2×D2=30+2*15*=60 cm, assuming that the auxiliary masts have the same diameter D2.

In the example of FIG. 2, the three masts are arranged so that the width L of the support 115 corresponds to the sum of the diameters of the three masts. According to a variant embodiment not illustrated, the two auxiliary masts 118*a*, 118*b* are brought closer to each other in the Y direction, so that the distance separating them is less than the diameter D1 of the main mast. In this case, the size of the support is less than the sum of the diameters of the three masts. Such an arrangement makes it possible to increase the azimuthal aperture of each of the dipole arrays, in particular by promoting radiation at the rear of the support, which is not the case with prior art planar reflector antennas.

With reference to FIG. 3, the relative positioning of the dipoles 112, 114 of the two arrays 104, 106 of the antenna device 102 will now be described in more detail.

In this Figure, the centers 112*c* of the low-frequency dipoles 112 are represented by stars*, while the centers 114*c* of the high-frequency dipoles 114 are represented by crosses +. This nomenclature also applies to FIGS. 21 to 25 which will be described later.

As explained previously, the low-frequency dipoles 112 are aligned vertically along the vertical axis A1. These are spaced regularly by a distance d1 corresponding to the pitch of the low-frequency array. The value of this distance d1 may be adjusted so as to limit or eliminate the presence of secondary lobes in a vertical plane of the radiation pattern of the low-frequency array. For example, in the case where the low frequency is equal to 100 MHZ, the distance d1 is adjusted so that d1=0.72·λ, where λ denotes the wavelength associated with the operating frequency of the low frequency array. Generally speaking and without other constraints, the pitch d1 of the low frequency array is between 0.7·λ and 0.8·λ so as to maximize the radiation in all directions contained in a horizontal plane, and more generally between 0.5·λ and λ.

For their part, the high-frequency dipoles 114 are arranged on the auxiliary masts 118*a*, 118*b*, such that each low-frequency dipole 112 is positioned vertically between a respective pair P1, P2 of high-frequency dipoles 114.

For example, the high-frequency dipoles 114 are divided into distinct pairs P1, P2 respectively associated with the low-frequency dipoles 112. The expression "distinct pairs" means that the same high-frequency dipole 114 belongs to only one pair P1, P2.

The two high-frequency dipoles 114 of each pair P1, P2 vertically frame the associated low-frequency dipole 112. For example, each low-frequency dipole 112 is positioned vertically in the middle of the high-frequency dipoles 114 of the associated pair P1, P2. This means that, along the axis A1, each low-frequency dipole 112 is vertically equidistant by the same height h from the two high-frequency dipoles 114 of the associated pair P1, P2.

Preferably, the high-frequency dipoles 114 of each pair P1, P2 are aligned vertically.

In the example illustrated in FIG. 3, for each pair P1, P2, the high-frequency dipoles 114 are spaced by the same pitch d2. The lower dipole of the pair P1 is spaced from the upper dipole of the pair P2 by an inter-pair distance d12. The inter-pair distance d12 may be adjusted so as to modify the shape of the radiation pattern of the high-frequency array. In particular, the inter-pair distance d12 can be equal to the pitch d2 of the high-frequency array, so that d12=d2, so as to simplify the manufacturing of the array.

Furthermore, preferably, at least one pair of high frequency dipoles 114 is horizontally offset (i.e. relative to the Y direction) to the right of the plane (A1, A2) comprising the low frequency dipoles 112 and at least one pair is horizontally offset to the left of the plane (A1, A2). In this way, the high frequency dipoles 114 are distributed on either side of the low frequency dipoles 112.

This right and left offset simplifies the addition of the high-frequency dipoles 114, since it is possible to fix each pair P1 of high-frequency dipoles 114 offset to the left on the auxiliary mast 118*a*, and each pair P2 offset to the right is fixed on the other auxiliary mast 118*b*.

Furthermore, thanks to this offset to the right and to the left, the deformation of the radiation pattern of the low-frequency dipoles 112 introduced by the pair(s) of high-frequency dipoles 114 on the right is compensated at least in part by the pair(s) of high-frequency dipoles 114 on the left, and vice versa.

Preferably, the pairs of high-frequency dipoles 114 are distributed in a balanced manner to the right and to the left, so that each of the auxiliary masts 118*a*, 118*b* has the same number of pairs of dipoles. In other words, there are as many high-frequency dipoles to the right as to the left of the low-frequency dipoles (within one pair when the number of low-frequency dipoles 112 is odd). This improves the compensation for the deformation of the radiation pattern of the low-frequency dipoles 112.

More preferably, the pairs P1, P2 of high-frequency dipoles 114 are alternately offset to the right and to the left. This also improves the compensation of the deformation of the radiation pattern of the low-frequency dipoles 112.

Still to improve this compensation, the offset to the right and to the left is, preferably, the same and noted by the reference "e" in FIG. 3. More precisely, the first pair P1 is offset horizontally (i.e. along the Y axis), by a distance e to the left of the low-frequency dipoles 112, while the second pair P2 is offset horizontally, along the Y axis, by the same distance e but to the right of the low-frequency dipoles 112.

In other embodiments (not shown), the offset of the pairs may be different on the right and left of the low-frequency dipoles 112.

With reference to FIG. 4 illustrating a cross-sectional view along the plane (A1, A2) of the low-frequency array 104, the antenna device 102 comprises an electrical connection 119, called low frequency, from the transmitter/receiver 108 to the low-frequency dipoles 112.

This low frequency electrical connection 119 comprises, for example, an outer electrical connection 121 connecting the transmitter/receiver 108 to the support 115. This outer electrical connection 121 is, for example, a coaxial cable.

The low-frequency electrical connection 119 further comprises, carried by the support 115, an input/output connector 120, called low frequency, to which the outer electrical connection 121 is designed to be wired. In particular, the low-frequency connector 120 is carried by the main mast 116. Preferably, the low-frequency connector 120 is a coaxial connector.

The low-frequency electrical connection 119 further comprises, in the support 115, for each low-frequency dipole 112, an inner electrical conductor 122*a*, 122*b* electrically connecting the low-frequency connector 120 to the low-frequency dipole 112 considered. Each inner electrical conductor is connected to the low-frequency connector 120 at a bifurcation point C. In particular, the inner conductor 122*a*, 122*b* runs, from the low-frequency connector 120, inside the main mast 116 then inside the leg 112*b* of the low-frequency dipole 112 considered, to reach one of its arms 112*a*. In the case where the leg 112*b* is double, the inner conductor 120 runs in one of its tubes.

The arm 112*a* reached by the inner conductor 122*a*, 122*b* is the one pointing downwards in the example of FIG. 4.

The other arm 112*a* may be connected to the inner electrical conductor 122*a*, 122*b* by a conductive section 124 passing through the gap between the arms 112*a*.

Alternatively, the conductive section 124 is not electrically connected to the downward-pointing arm 112*a* but capacitively coupled to the latter through the gap between the two arms 112*a* of the low-frequency dipole 112.

The inner electrical conductor 122*a* may comprise a plurality of electrical junctions placed end to end as illustrated in FIG. 4.

Each inner conductor 122*a*, 122*b* may have a variable section along its length, as illustrated in FIG. 4. Thus, the dimension of this section can be adjusted locally to perform appropriate impedance transformations, so as to best adapt the impedance of the low-frequency array 104 to that of the connector 120 and thus avoid losses due to impedance mismatch.

Furthermore, the main mast 116 and the leg 112*b* of each low-frequency dipole 112 are in electrical contact with each other and thus serve as a return line to connect all the low-frequency dipoles 112 to the same reference potential, for example a common ground or earth. The main mast 116 and the leg 112*b* surrounding the inner conductor 122*a*, 122*b* thus form a coaxial connection.

Using the main mast 116 and each leg 112*b* as a return line has several advantages.

On the one hand, it contributes to making the antenna device 102 electrically symmetrical, so that it generates little imbalance of the electrical currents circulating inside the main mast 116 and on the arms 112*a* of the low-frequency dipoles 112 (in transmission or reception). In particular, the use of the main mast 116 as a return line makes it possible to avoid using coaxial cables outside the mast which would have the effect of increasing the equivalent section of the conductors thus obstructing the radiation at the rear of the mast.

On the other hand, it facilitates the impedance matching of the low-frequency array 104 in line with the characteristic impedance of the coaxial line 121 (generally of the order of 50Ω) when the latter is connected to the low-frequency connector 120.

Furthermore, the support 115 comprises, for example, a plurality of decoupling devices 126 configured to limit disturbances produced by the high-frequency array 106, for example by intermodulation phenomena, on the low-frequency array 104.

These decoupling devices 126 are fixed to the support 115, for example to the main mast 116. Each decoupling device is, for example, associated with one of the low-frequency dipoles 112 and electrically connected to the inner conductor 122*a*, 122*b* of this low-frequency dipole 112. In the illustrated example, two decoupling devices 126 are associated with each low-frequency dipole 112. However, the number of decoupling devices 126 associated with each low-frequency dipole could be different, for example between 1 and 4.

Preferably, the decoupling devices 126 are rejection filters comprising, for example, an open angled coaxial line. The angled coaxial line 126 includes an outer conductor 126*b* and an inner conductor 126*a* extending inside the outer conductor 126*b* and electrically insulated therefrom. In the present example, the electrical insulation is provided by air. However, in other embodiments, the air may be replaced by any other dielectric material having low dielectric losses, i.e. a dielectric tangent tan (ε "/ε') less than or equal to 0.001, where ε" and ε' represent respectively the imaginary portion and the real portion of the electrical permittivity.

The inner conductor 126*a* is in contact with the inner conductive line 122*a*, 122*b*. As illustrated, the open angled coaxial line is L-shaped and has a longitudinal portion of length L1*z* extending parallel to the main mast 116 along the Z axis and a transverse portion of length L1*x* extending perpendicular to the main mast 116 along the X direction. Thus, each open angled coaxial line has a developed length L1 equal to the sum of the lengths of the longitudinal and transverse portions, i.e. L1=L1*z*+L1*x*.

Preferably, the developed length L1 of each open angled line is between $\lambda_g/6$ and $\lambda_g/3$, where $\lambda_g$ is the guided wavelength corresponding to the central operating frequency of the high-frequency array 106. By central frequency, it will be understood that this is the median frequency of the frequency band of the radio service provided by the high-frequency array, as defined above.

In other embodiments (not described), other decoupling devices may be considered, such as an open coaxial line without conductor or any other equivalent device.

In the example of FIG. 4, four rejection filters 126 are distributed along the main mast 116 so as to form two pairs, each pair being located at a respective dipole. The 126 rejector filters are mounted two by two head to tail (or back to back). Other orientations of the angles of the rejector filters can also be considered knowing that the relative orientation of the angles of the rejector filters has no significant influence on the decoupling performances.

For example, the filters of a pair of rejector filters 126 are vertically spaced from each other by a separation distance L4 between two filters of the same pair called intra-pair, the latter being less than three times the guided wavelength $\lambda_g$, i.e. L4<3×$\lambda_g$.

The positioning of the rejection filters 126 relative to the low-frequency dipoles 112 may be adjusted so as to limit their interaction with the low-frequency dipoles 112 as much as possible. For this purpose, the rejection filters 126 are arranged, for example, two by two at the leg of the respective dipoles, that is to say opposite the arms of the low-frequency dipoles 112. In general, the position of the decoupling devices 126 may be optimized so that they disturb the low-frequency array as little as possible, in other words so that they deform the radiation pattern of the low-frequency array as little as possible.

According to an alternative embodiment (not shown), the rejection filters located at the ends of the main mast 116 could be inserted inside the mast 116.

The developed length L1 and the intra-pair separation length L4 may be adjusted so as to take into account the inter-array frequency spacing and their respective bandwidth, by rejecting as best as possible the frequency band associated with the other array, by facilitating or at least not degrading the impedance matching of the array on which they are installed and by making it possible to achieve the average and peak power capacities required according to the use considered.

Preferably, the outer conductor 126*b* is slightly longer in the Z direction than the inner conductor 126*a*. This difference in length L4 makes it possible to limit radiation from the inner conductor 126*a* at the end of the open line. It can also reduce possible interaction with a metal plug located at the end.

The inner conductors 126*a* and outer conductors 126*b* have respective diameters which can be adjusted so as to obtain an impedance of the open angled coaxial line 126 of between 10 and 200Ω and to support average and maximum (peak) electrical powers required for reception and/or transmission.

Preferably, the decoupling devices 126 are all identical and positioned along the main mast 116, so that they form a symmetrical assembly with respect to the center C of the coaxial line 122, this center C corresponding to the place where the inner conductive lines 122*a*, 122*b* meet so as to be connected to the connector 120. Preferably, the center C of the coaxial line 122 is located at the connector 120. In practice, it was considered that the decoupling devices 126 are identical insofar as they have the same structure with dimensions, such as the length, which are almost equal, i.e. varying by approximately +/−10% around a median value.

With reference to FIG. 5 illustrating a three-dimensional schematic view of the high-frequency array 106, the antenna device 102 comprises an electrical connection 127, called high frequency, from the transmitter/receiver 110 to the high-frequency dipoles 114.

This high-frequency electrical connection 127 shown in simple dotted lines, comprises for example an outer electrical connection 125 connecting the transmitter/receiver 110 to the support 115. This outer electrical connection 125 is for example a coaxial cable.

The high-frequency electrical connection 127 further comprises, carried by the support 115, an input/output connector 128, called high-frequency, to which the outer electrical connection 125 is designed to be wired. In particular, the high-frequency connector 128 is carried by one of the auxiliary masts 118*a*, 118*b*. Preferably, the high-frequency connector 128 is a coaxial connector.

The high-frequency array 106 further comprises a coaxial line 130 configured to preferentially connect in parallel all of the high-frequency dipoles 114 of the array to the high-frequency connector 128. Thus, from the high-frequency connector 128, the coaxial line 130 splits into two separate branches 103*c*, 130'*c* which themselves split into two sub-branches {130*a*, 130*b*}, {130'*a*, 130'*b*) respectively, as illustrated in FIG. 5. A parallel connection gives the array an extended bandwidth compared to a series connection where all the dipoles are connected in series conventionally one after the other without branching along the line.

In alternative embodiments (not shown), the coaxial connection may be serial or mixed, in the sense that it combines a serial architecture and a parallel architecture, depending on the intended application.

As with the coaxial line of the low-frequency array, the coaxial line 130 of the high-frequency array 106 comprises an inner conductive portion and an outer conductive portion surrounding the inner conductive portion. The inner and outer conductive portions are electrically conductive but electrically insulated from each other by air or any other dielectric material.

The inner conductive portion of the coaxial line is a filiform electrical conductor running inside the auxiliary masts 118*a*, 118*b* and inside the legs of the respective dipoles to connect one of the arms 114*a* of each of the dipoles to the high-frequency connector 128. The filiform electrical conductor comprises one or more sections 130*a*, 130*b*, 130*c*, 130'*a*, 130'*b*, 130'*c*. Each section can itself have subsections of different impedances.

In the illustrated example, the two dipoles fixed on an upper portion of the auxiliary mast 118*a* are connected to the connector 128 via the sections 130*a*, 130*b*, 130*c*. The two dipoles fixed on a lower portion of the other auxiliary mast 118*b* are connected to the connector 128 via the sections 130'*a*, 130'*b*, 130'*c*. Section 130'*c* comprises a portion running inside a hollow crosspiece 132 connecting the two auxiliary masts 118*a*, 118*b*.

Given that the section 130'*c* running inside the crosspiece 132 has a length $h_y$, the high-frequency connector 128 is positioned vertically at a distance $h_{z1}$ from one pair of high-frequency dipoles and at a distance $h_{z2}$ from the other pair of high-frequency dipoles, such that each of the high-frequency dipoles is connected to the high-frequency connector 128 along an electrical path of the same length, i.e. $h_{z1}=h_{z2}+h_y$, so that the currents flowing inside the lines are balanced between the high-frequency dipoles 114.

The outer conductive portion of the coaxial line comprises the auxiliary masts 118*a*, 118*b* and the legs 114*b* of the high-frequency dipoles 114. The outer conductive portion thus formed serves as a return line for the currents of the coaxial line, so that all the dipoles of the high-frequency array 114 are connected to the same reference potential. The reference potential can be obtained by connecting each auxiliary mast 118*a*, 118*b* to a common ground element or to earth. By bringing all the low-frequency dipoles 112 and high-frequency dipoles 114 to the same reference potential, the radiation patterns of the low-frequency arrays 104 and high-frequency arrays 106 are stabilized.

Preferably, the leg of each dipole has a length approximately equal to one quarter of the wavelength associated with the operating frequency of the array to which it belongs. This particular length has several advantages.

On the one hand, it contributes to making the antenna system more symmetrical in terms of the distribution of electric currents across the coaxial line connecting each of the dipoles of the same array, in particular by ensuring a homogeneous interface between the coaxial line which may be more or less asymmetrical and the symmetrical structure of the dipole.

On the other hand, it makes it possible to avoid excessive deformation of the azimuthal radiation pattern of the dipole array that may result from an interaction of the dipoles with their support mast. For example, a leg length that is too long will have the effect of crushing the azimuthal radiation pattern until the pattern becomes bidirectional.

As illustrated in FIG. 6, the high-frequency array comprises a connecting device 129 configured to connect the two auxiliary masts 118*a*, 118*b* carrying the high-frequency dipoles 116. This connecting device 129 comprises a longitudinal hollow tubular part 129*a* extending vertically, in particular along a portion of one 118 of the two masts. The connecting device 129 further comprises at least one hollow crosspiece 129*b*, transversely connecting the two masts 118*a*, 118*b* together.

Preferably, the tubular part 129*a* is fixed on the mast 118*a* as illustrated in the diagram on the right noted b). According to an alternative embodiment as illustrated in the diagram on the left noted a), an additional crosspiece 129*b* is arranged on the tubular part 129*a* so that the latter is also fixed to the other mast by means of this additional crosspiece.

As a whole, the connecting device 129 is hollow so as to provide a passage path for the coaxial lines to connect the high-frequency dipoles 114 to the connector 128.

The high-frequency array 106 will now be described with reference to FIG. 7 which illustrates a side sectional view along the plane (X,Z) of FIG. 5, more precisely along the section line identified by "A".

On the left part of FIG. 7 is shown in an enlarged manner the upper pair of high-frequency dipoles 114 carried by the auxiliary mast 118*a*.

As previously described with reference to FIG. 5, the high-frequency dipoles of the upper pair are electrically connected to the high-frequency connector 128 via the coaxial line 130.

As illustrated in FIG. 7, the inner portion of the coaxial line 130 comprises a plurality of sections 130*a*, 130*b*. These sections are of different sizes (i.e. diameter, length) and have different impedances.

The dipoles of the upper pair belong to the same vertical plane denoted $\pi 1$ comprising the auxiliary mast 118*a*, while the dipoles of the lower pair belong to the same other vertical plane $\pi 2$ comprising the auxiliary mast 118*b* hidden behind the auxiliary mast 118*a* according to the plane of FIG. 7. Thus, the high-frequency dipoles of each pair are aligned vertically.

In the case where the high-frequency array comprises a plurality of upper pairs (instead of a single pair as shown in FIG. 7), all the dipoles of these pairs belong to the same vertical plane π1, so that the dipoles arranged on the auxiliary mast 118*a* are all aligned vertically.

Similarly, if the high-frequency array comprises a plurality of lower pairs (instead of a single pair as shown in FIG. 7), these belong to the same vertical plane π2, so that the dipoles arranged on the auxiliary mast 118*b* are all aligned vertically.

In general, dipoles will be considered to be vertically aligned if they belong to the same vertical plane (i.e. including the Z direction).

As described above, for each of the two pairs of dipoles, the extremal dipoles are larger than the central dipoles. For example, the extremal dipole has a leg of length H1 greater than that H2 of the leg of the central dipole. The extremal dipole has a section of diameter greater than that of the section of the central dipole.

Referring to FIG. 8, the connecting device 129 shown in FIG. 6 will now be described in more detail.

Advantageously, the connecting device 129 is configured to reject the frequency band in which the low-frequency array 104 operates. For this purpose, the connecting device 129 comprises a decoupling device 136 for decoupling the high-frequency dipoles from the low-frequency dipoles, so that the high-frequency dipoles are not disturbed by the presence of the low-frequency dipoles. The decoupling device 136 is connected to the coaxial line 130'*c* running between the two auxiliary masts 118*a*, 118*b*. It is fixed along the tubular portion 129*a* of the connecting device 129.

The decoupling device 136 comprises two rejector filters 136*a*, 136*b* configured to reject low frequencies. Each rejector filter comprises a pair of open angled coaxial lines 138 disposed head-to-tail on either side of the tubular portion 129*a* near a crosspiece 129*b*.

Each rejector filter is associated with a pair of high-frequency dipoles. However, in other embodiments (not shown), a plurality of pairs of rejection filters may be associated with each pair of high-frequency dipoles; the number of filters may vary between 1 and 3 typically.

As previously described for the low-frequency array, each open angled coaxial line 138 includes an inner conductor in contact with the coaxial line 130'*c* running inside the tubular portion 129*a* used to connect the high frequency dipoles. Each open angled coaxial line 138 has a developed length between $\lambda'_g/6$ and $\lambda'_g/3$, where $\lambda'_g$ denotes a guided wavelength corresponding to the central operating frequency of the high-frequency array.

As previously described for the low-frequency array, the outer conductor of these angled coaxial lines 138 is preferably slightly elongated relative to the inner conductor, so as to limit radiation at the open end of the line or possible interaction with a metal plug located at the end. The ratio of the diameters of the inner and outer conductors constituting said open angled coaxial lines can be advantageously adjusted to obtain an impedance between 10 and 200Ω and allow the desired average and peak power resistances depending on the use considered. The dielectric present between the inner and outer conductors may be air or any dielectric material having a low loss tangent.

The transmission performance results of the antenna device 102 according to the first embodiment described above with reference to FIGS. 1, 3-8 will now be presented with reference to FIGS. 9 to 13.

FIG. 9 illustrates an azimuthal radiation pattern of the low-frequency array 104 obtained for three distinct operating frequencies (88 MHZ, 98 MHZ, 108 MHZ) selected from a frequency band of an FM broadcasting service.

This figure shows the normalized radiation pattern at 0 dB of the low-frequency array expressed in dB in the azimuthal plane (X,Y) as a function of an azimuthal angle φ expressed in degrees.

This pattern shows that the radiation of the low-frequency array 104 is symmetrical although not perfectly isotropic (i.e. quasi/pseudo-omnidirectional) with a lower gain at the rear (φ=) 0° of the array than at the front (φ)=180°. The gain is almost constant to within about −2 dB, on the front part of the array, i.e. for an azimuthal angle q between −180° and −90° and between 90° and 180°. At the rear of the low-frequency array 104, the attenuation varies between 2 dB and 6 dB depending on the azimuthal angle q, i.e. for −90°<φ<0° and −0°<φ90°.

Such radiation shows that the low-frequency array has an azimuthal opening at −3 dB at least equal to 180°. These results remain generally valid for the three FM frequencies tested.

FIG. 10 illustrates an elevation radiation pattern of the low-frequency array 104 obtained under the same conditions as for FIG. 9.

This figure shows the normalized radiation pattern expressed in dB in the vertical plane (X,Y) as a function of the elevation angle 0 expressed in degrees.

This pattern shows the presence of some secondary lobes but these remain globally negligible, so that most of the energy is radiated in a horizontal dimension, i.e. for −120°<θ<−60° (at the front of the array) and 60°<θ<120° (at the back of the array).

FIG. 11 illustrates an azimuthal radiation pattern of the high-frequency array 106 obtained for three distinct operating frequencies (174 MHZ, 200 MHZ, 225 MHZ) selected in a frequency band of a DTR service.

Such radiation shows that the high-frequency array 106 has an azimuthal aperture at −3 dB of at least 180° at the front of the array (i.e. for −180°<φ<−90° and 90°<φ<) 180°. The gain at the rear of the antenna is all the more reduced as the operating frequency is high.

FIG. 12 illustrates an elevation radiation pattern of the high-frequency array 106 obtained under the same conditions as for FIG. 11.

In view of this pattern, it can be seen that despite the presence of two secondary lobes, on either side of the horizontal plane, the high-frequency array 106 radiates substantially forward (θ=−90°) and backward (θ=90°) to a lesser extent.

With reference to FIG. 13, the results of decoupling in transmission between the low-frequency array 104 and the high-frequency array 106 will now be described.

The pattern in FIG. 13 illustrates the amplitude of the parameter S in transmission denoted S12 and expressed in dB, as a function of the operating frequency expressed in MHz for the antenna device 102 operating in a frequency band of an FM service (88-108 MHZ) and in a frequency band of a DTR service (174-225 MHz), these bands corresponding to those already used to produce the radiation patterns described previously with reference to FIGS. 9-12.

In FIG. 13, the curve shown in a solid line represents the parameter S12 in the case where the antenna device 102 comprises the decoupling devices 126, 136, as described with reference to FIGS. 4, 7, 8 respectively on the low-frequency array 104 and on the high-frequency array 106. In comparison, the dotted line curve represents the parameter S12 in the absence of the decoupling devices 126, 136 respectively on the low-frequency array and on the high-frequency array.

These results show that for the DTR band between 174 and 225 MHZ, an additional maximum isolation of approximately 40 dB is obtained thanks to the decoupling devices 126, 136.

Thus, the use of the rejection filters 126 of the low-frequency array 104 makes it possible to very significantly reduce (i.e. maximum reduction of approximately 40 dB) the quantity of radio waves transferred from the low-frequency array 104 to the high-frequency array 106 in the operating frequency band of the high-frequency array 106.

Similarly, by comparing the two curves in the FM domain (88-108 MHZ), it clearly appears that the use of the rejector filters 136 of the high-frequency array 106 makes it possible to reduce to a lesser extent (i.e. maximum reduction of approximately 10 dB) the quantity of radio waves transferred from the high-frequency array 106 to the low-frequency array 104 in the operating frequency band of the low-frequency array 104.

FIG. 14 illustrates an alternative embodiment of the low-frequency array 104 described with reference to FIG. 4, according to which the decoupling device 126 of the low-frequency array 104 is replaced by a coaxial low-pass filter 140 configured to reject the frequencies of the high-frequency array 106.

The input/output connector 120 of the low-frequency array 104 is moved to the end of the coaxial low-pass filter 140. However, it can be left in its original place in the event that the coaxial low-pass filter itself is equipped with its own coaxial input and output connectors.

Preferably, the coaxial low-pass filter 140 comprises an alternation of high and low impedance coaxial sections, denoted respectively 141.*k* and 142.*k*−1, where k is a natural integer preferably varying from 2 to 6. In the illustrated example, the coaxial low-pass filter 140 includes four high-impedance sections 141.1, 141.2, 141.3, 141.4 and three low-impedance sections 142.1, 142.2, 142.3.

The coaxial sections will be sized so that their impedance varies preferably between 10 and 200Ω and in line with the average and peak power ratings to be supported in the context of the exploitation of the invention.

Similarly, the order of the filter 140 thus constituted will be adjusted to reach the desired rejection level. By definition, the order of the filter corresponds to the number of poles constituting it and in the present case, each section corresponds to one pole.

The length of the coaxial sections will preferably be between $\lambda_g/20$ and $\lambda_g/5$, where $\lambda_g$ represents the guided wavelength associated with the central operating frequency of the high-frequency array 106.

The coaxial elements (sections) will preferably be held in position by continuous or discontinuous dielectric elements, for example polytetrafluoroethylene, and whose relative permittivity will preferably be less than 3 and the loss tangent preferably less than 0.001.

An alternative embodiment of the high-frequency array will now be described with reference to FIGS. 15 and 16. This variant is designated by the reference 206.

According to a particularity of this variant, the decoupling devices 126 of the high-frequency array are partly integrated and the coaxial line 127 in the auxiliary masts 118*a*, 118*b* allowing the input/output connector to be placed equidistant and symmetrically relative to the support 116 of the low-frequency array.

FIG. 15 illustrates a sectional view in the (X,Z) plane of the high-frequency array according to this variant embodiment which will bear the reference 206.

As previously described, the high-frequency dipoles 214 are connected to the input/output of the high-frequency array by a coaxial line 230 comprising a plurality of junctions 130*a*, 130*b*, 130*c* to feed the upper dipole pair and a plurality of junctions 130'*a*, 130'*b*, 130'*c* to feed the lower dipole pair. However, unlike what has been previously described with reference to FIG. 6, the two auxiliary masts 118*a*, 118*b* are not connected by means of a tubular part 129*a* but by means of three hollow tubular crosspieces 249*a*, 249*b*, 249*c*, extending in the Y direction and through which the transverse sections 130*c*, 130*c*' run. These tubular crosspieces 249*a*, 249*b*, 249*c* are illustrated more clearly in FIG. 16 which will be described below.

The high-frequency array 206 comprises four dipoles 214*a*, 214*b*, 214*c*, 214*d* of different dimensions. For example, the extremal dipoles 214*a*, 214*d* do not have the same dimensions as the central dipoles 214*b*, 214*c*. The two extremal dipoles 214*a*, 214*d* themselves have different dimensions relative to each other. Furthermore, the central dipoles 214*b*, 214*c* themselves have different dimensions relative to each other.

Advantageously, the dimensions of the high-frequency dipoles 214*a*, 214*b*, 214*c*, 214*d* may be adjusted so as to generate a particular phase distribution in the high-frequency array 206, for example to obtain a specific depointing of the vertical radiation pattern or else a filling (i.e. suppression) of the radiation zeros in this same vertical plane.

FIG. 16 illustrates in the transverse plane (Y,Z) the high-frequency array 206 of FIG. 15.

As previously described with reference to FIG. 8, the high-frequency array 206 comprises two decoupling devices 236.

According to a particular feature of the present variant, each decoupling device 236 comprises an angled coaxial line 238*b* and an open coaxial line 238*a*, the latter 238*a* being integrated inside an auxiliary mast 118*a*, 118*b*.

Furthermore, this variant differs from the embodiment described with reference to variant a) of FIG. 6, in particular in that a third crosspiece 249*c* is provided to connect the two auxiliary masts 118*a*, 118*b* at their center, where the input/output connector 228 of the high-frequency array is placed, i.e. where the branches 230*c*, 230*c*' meet.

From a radioelectric point of view, this embodiment variant has the advantage that the antenna device is perfectly symmetrical on its outer part, insofar as the input/output connector 228 can be placed equidistant from the two pairs of high-frequency dipoles (i.e. lower pair (214*c*, 214*d*) and upper pair (214*a*, 214*b*)). Furthermore, the two pairs of dipoles of the high-frequency array 206 are electrically connected to the input/output connector 228 along an equivalent electrical path. It follows that the antenna device according to this embodiment variant has symmetrical azimuthal radiation patterns in the (X,Y) plane.

Thus, by integrating into the auxiliary masts 118*a*, 118*b*, not only the entire high-frequency coaxial line used to connect the high-frequency dipoles, thanks in particular to the tubular crosspieces 249*a*, 249*b*, 249*c*, but also the open lines 238*a* used for decoupling, the antenna device has a reduced electrical size of the supports 118*a*, 118*b* as well as an improvement in the front/rear ratio of the radiation pattern of the high-frequency array compared to an equivalent less integrated solution.

With reference to FIG. 17, a variant embodiment of the antenna device 102 according to FIG. 1 will now be described.

According to this variant, the antenna device 102 further comprises at least one quarter-wave trap 150 associated with each of the low-frequency dipoles 112, so as to limit the influence of the legs of the low-frequency dipoles on the radiation of the high-frequency array 106.

In FIG. 17, a single low-frequency dipole 112 has been shown but it will be understood that the other low-frequency dipole of the antenna device 102 according to FIG. 1 could also be equipped with the same quarter-wave traps.

More generally, all or part of the low-frequency dipoles of the low array may be equipped with one or more quarter-wave traps.

According to the example illustrated in FIG. 17, a quarter-wave trap 150 is placed on each tube 112*b* constituting the leg of the low-frequency dipole 112.

For example, each quarter-wave trap 150 is made up of a hollow metallic cylindrical body. Each cylindrical body 150 has one end forming a closed section in direct contact with the outer surface of the tube 112*b* constituting the leg of the dipole. The other end 150*b* of the cylindrical body 150 forms an open section. Each cylindrical body 150 is arranged around the associated tube 112*b*.

The quarter-wave traps 150 associated with the low-frequency dipoles 112 are designed to create a high impedance on the tubes 112*b*, precisely at the location of the end 150*b* forming an open section, and to thus limit the contribution of the low-frequency dipoles 104 to the radiation of the high frequency array 106.

Each quarter-wave trap 150 is configured to operate in a frequency band around the frequency of interest, i.e. the central frequency $f_c$ of the service band used by the low-frequency array 104. Preferably, the frequency of interest $f=f_c$ is such that its corresponding wavelength is equivalent to four times the length of the quarter-wave trap 150. In other words, the quarter-wave trap 150 has a length L5 which is linked to the frequency of interest f according to the following expression $f=c/(4\times L5)$, where $c=3.10^8$ m/s.

Thus configured, the quarter-wave trap 150 has the effect of avoiding or at least limiting deformation of the azimuthal radiation patterns of the high-frequency array 106, over its operating frequency band.

According to the example of FIG. 17, the inventors observed a significant improvement in the radiation patterns of the high-frequency array 106, over approximately 10% of its relative bandwidth, between a minimum frequency ($f_{min}$) equal to 174 MHz ands a maximum frequency ($f_{max}$) equal to 192 MHZ, said relative bandwidth being expressed by $f_{max}$-$f_{min}$/$f_c$. However, this result will vary depending on the dimensions of the trap.

Preferably, each of these quarter-wave traps 150 has a length L5 approximately equal to a quarter of a wavelength associated with the operating frequency of the low-frequency array 104.

For example, the quarter-wave trap 150 is configured to reject a frequency range for which the radiation pattern of the low-frequency array 104 is likely to be impacted by the presence of the tubes 112*b* constituting the legs of the low-frequency dipoles 112.

In the example illustrated, each cylindrical body has a circular section. However, in other embodiments (not shown), this section can be adapted depending on the shape of the section of the leg of the dipole. For example, the section could be chosen square, rectangular or elliptical.

Advantageously, the cylindrical body is truncated longitudinally along a horizontal plane (X,Y), that is to say parallel to the extension dimension of the leg 112*b* of the low-frequency dipole 112. Thus, the cylindrical body 150 comprises a flat portion 150*a* (i.e. truncated portion) extending over the entire length L5 of the body, so that the body is asymmetrical.

Advantageously, the two truncated cylindrical bodies 150 are arranged respectively on the tubes 112*b* constituting the leg, so that the planar (truncated) parts 150*a* face each other, as illustrated in FIG. 17. Such an arrangement makes it possible to limit the capacitive effects between the quarter-wave traps of the same dipole.

To the extent that the two truncated cylinders 150 are a pair, we can consider that the assembly constituted by these two cylinders forms the quarter-wave trap of a double-legged dipole. In alternative embodiments where the leg of the dipole is single (i.e. made up of a single tube), it will be understood that the quarter-wave trap is made up of a single cylinder arranged around the single tube.

The addition of such traps is particularly advantageous in the case where the legs of the low-frequency dipoles have a length approximately equal to half a wavelength associated with the frequencies broadcast on the high-frequency array.

FIG. 18 illustrates, in solid lines, a radiation pattern of the high-frequency array 106, when the low-frequency dipoles 112 are all equipped with quarter-wave traps 150 as described previously with reference to FIG. 17.

According to this radiation pattern, the high-frequency array 106 has an azimuthal aperture at −3 dB greater than 180° with uniform radiation at the front of the array, i.e. for an azimuthal angle between 90° and 180° and between −180° and −90°.

Furthermore, FIG. 18 illustrates, in dotted lines, the radiation pattern of the high-frequency array 106 obtained by removing the quarter-wave traps 150 of the low-frequency array 104.

By comparing the two radiation patterns of FIG. 18, it clearly appears that the presence of the quarter-wave traps 150 on the low-frequency dipoles 112 allows the high-frequency array 106 to maintain an azimuthal opening of at least 180° at a level between 0 and −3 dB, with almost constant radiation at the front of the array.

In the absence of a quarter-wave trap on the low-frequency array, the azimuthal radiation pattern of the high-frequency array presents a crushing as illustrated in dotted lines in FIG. 18. This is due to the induced radiation from the legs of the low-frequency dipoles which interacts destructively with the direct radiation from the high-frequency array, whether the low-frequency array is active or inactive. Thus, the addition of quarter-wave traps 150 on the legs 112*b* of the low-frequency dipoles 112*a* has the effect of reducing the excitation of these legs and consequently of reducing the deformations of the radiation pattern at the operating frequency of the high-frequency array.

The radiation patterns in FIG. 18 were obtained in the case where the high-frequency array 106 is configured to emit signals in the DTR frequency bands, in particular at 174 MHZ. Thus, the effect described above was illustrated for a high operating frequency equal to 174 MHZ but a similar effect presenting a progressive decrease could also be observed at high frequencies up to approximately 192 MHz.

With reference to FIG. 19, an antenna device according to a second embodiment of the invention which will bear the reference 202 will now be described.

As in the first embodiment, the antenna device 202 comprises a low-frequency array and a high-frequency array. In the example illustrated, the low-frequency array comprises two low-frequency dipoles 212 with double legs 212*b*. The high-frequency array includes four high-frequency dipoles 214 with double legs 214*b* and a low-frequency connector 220.

The second embodiment differs from the first embodiment mainly in that the low-frequency dipoles 212 are inclined relative to the high-frequency dipoles 214 which remain oriented vertically.

Thus, the arms 212*a* of the low-frequency dipoles 212 are oriented so that they form a non-zero angle α, preferably equal to 45°, relative to the direction in which the arms 214*a* of the high-frequency dipoles 214 are oriented (i.e. relative to the vertical).

In the present example, the two arms of each dipole are co-linear with each other. In this case, the direction of the dipole corresponds to the line along which the two arms are aligned. More generally, the direction of a dipole is defined by the line perpendicular to the bisector of the angle formed between the two arms of the dipole.

Conversely, in a variant embodiment (not shown), it is the high-frequency dipoles which are inclined (or oriented) relative to the low-frequency dipoles while the low-frequency dipoles are aligned vertically on the main mast.

Thus, more generally, the low-frequency dipoles 212 and the high-frequency dipoles 214 are inclined relative to each other according to the invention.

The inclination of the dipoles of one of the arrays relative to the direction of the dipoles of the other array at an angle between −90° and 0° or between 0° and 90° makes it possible to promote inter-service decoupling (or inter-array when each array provides a service in a distinct frequency band) by adding polarization decoupling.

In the example illustrated, the low-frequency dipoles are suitable due to their orientation to emit and/or receive radiation comprising a horizontal component and a vertical component, while the high-frequency dipoles due to their vertical orientation will emit and/or will only receive vertically polarized electric fields.

The inclination of the dipoles also makes it possible to reduce the influence of the dipole supports on the rear radiation of the array, thus reducing the front/back ratio of the radiation pattern of the array whose dipoles are inclined.

As described for the first embodiment, the low-frequency array comprises a decoupling device including rejector filters 226 arranged along the main mast 216.

For example, in the extreme case where one of the arrays is configured to transmit and/or receive in horizontal polarization (i.e. having a horizontal orientation of its dipoles) and the other array is configured to transmit and/or receive in vertical polarization (i.e. presenting a vertical orientation of its dipoles), the decoupling devices associated respectively with the low-frequency array and the high-frequency array could possibly be eliminated. This makes it possible to simplify the structure and weight of the antenna device, in the event that the necessary inter-array decoupling would be 30 to 40 dB maximum.

In the example illustrated in FIG. 19, all the high-frequency dipoles 214 are carried by a single auxiliary mast 218, while the low-frequency dipoles 212 are fixed both on the main mast 216 and on the single auxiliary mast 218, i.e. a respective leg 212*b* on each mast to allow the fixation of the inclined dipoles. Obviously, other dipole support configurations could be considered (e.g. one or more auxiliary masts), for example depending on whether the leg of the dipoles is single or double.

With reference to FIG. 20, an antenna device according to a third embodiment of the invention will now be described.

A particularity of this third embodiment is that the low-frequency dipoles 312 and the high-frequency dipoles 314 are inclined respectively by −45° and +45° relative to the direction of extension of the masts 316, 318*a*, 318*b* corresponding to the vertical direction Z. In other words, the low-frequency dipoles 312 are oriented relative to the high-frequency dipoles 314, so as to form a right angle) (β=90°. This spatial quadrature configuration of the two arrays has the advantage of facilitating their respective decoupling.

In alternative embodiments (not shown), other inclinations could obviously be considered.

As for the first and second embodiments, each low-frequency dipole 312 is framed vertically by a pair of high-frequency dipoles 314 but another particularity of the third embodiment is that a high-frequency dipole 314' is arranged at the center of each low-frequency dipole 312.

In the example shown, the three masts are all aligned in the Y direction.

Other variants of arrangement of the dipoles of the antenna device according to the invention will be described below with reference to FIGS. 21 to 25, where the location of a high-frequency dipole is represented schematically by a cross +, while the location of a low-frequency dipole is represented by a star *. Pairs or groups of high-frequency dipoles are represented by a closed dotted line outline.

In the examples of FIGS. 21 to 24, we place ourselves in the case where the support of the low-frequency dipoles is constituted by a main mast 116 while the support of the high-frequency dipoles is constituted by two auxiliary masts 118*a*, 118*b*, such as those described with reference to the first embodiment.

In this case, it is assumed that the high-frequency dipoles are distributed in a balanced manner on the two auxiliary masts 118*a*, 118*b*, so that the arrangement of the dipoles is symmetrical. Obviously, according to alternative embodiments (not illustrated), the number of masts can be adapted depending on whether the legs of the dipoles are single or double.

FIG. 21 illustrates a first variant 402, in which the pairs P1, P2, P3, P4, of high-frequency dipoles are arranged alternately from left to right of the low-frequency dipoles.

Thus, the alternating positioning of the pairs of high-frequency dipoles, i.e. on one side and on the other alternately, in relation to the low-frequency dipoles, makes it possible to nest the two arrays over a reduced height thus limiting the bulk of the antenna device, while ensuring effective decoupling of the arrays leading to symmetry of their respective radiation in the azimuthal plane.

FIG. 22 illustrates a second variant 502, in which the pairs of high-frequency dipoles are distributed on the two auxiliary masts, so as to form a so-called upper group G1 of high-frequency dipoles arranged on an upper portion of one of the auxiliary masts 118*a* and another so-called lower group G2 of high-frequency dipoles arranged on a lower portion of the other auxiliary mast 118*b*.

In this example, each group G1, G2 is made up of two pairs of high-frequency dipoles, so that the arrangement of these two groups is symmetrical with respect to a central point O of the low-frequency array.

This central symmetry ensures that the deformations in the radiation patterns induced by one group of dipoles are compensated by the other group so that the radiation patterns remain symmetrical in the azimuthal plane.

FIG. 23 illustrates a third variant 602, in which only the pairs of high-frequency dipoles arranged to the left of the low-frequency dipoles vertically frame the latter respectively.

This embodiment also has the particularity that a high-frequency dipole of each of the pairs is common with the adjacent pair. In other words, each high-frequency dipole belongs to two adjacent pairs, except for the two dipoles located respectively at the two ends of the auxiliary mast 118*a*.

In this example, each low-frequency dipole is framed vertically to the left by a pair of high-frequency dipoles and opposite to the right with a high-frequency dipole. Thus, all the high-frequency dipoles arranged to the right of the low-frequency dipoles are aligned along the Y axis (horizontally) with the latter.

FIG. 24 illustrates a fourth variant 702, in which the high-frequency dipoles are alternately distributed to the right and to the left of the low-frequency dipoles, so that two consecutive low-frequency dipoles frame a low-frequency dipole in a direction oblique to vertically.

Each low-frequency dipole is separated vertically, preferably by the same height h/2 relative to the two high-frequency dipoles of the pair with which it is associated. Thus, each low-frequency dipole is framed obliquely by a pair of high-frequency dipoles so that the latter are fixed on two separate auxiliary masts 118*a*, 118*b* equidistant from the low-frequency dipole.

In alternative embodiments (not illustrated), each low-frequency dipole may not be positioned equidistant from the high-frequency dipoles of the associated pair.

FIG. 25 illustrates an embodiment 802 in which all the high-frequency dipoles are disposed on the same side (for example to the left as illustrated) of the low-frequency dipoles. In this case, all the high-frequency dipoles are disposed on the same auxiliary mast 118.

It clearly appears that an antenna device or a communication system including such an antenna device according to any one of the embodiments or any of its variants as described above makes it possible to vertically nest the high-frequency and low-frequency arrays so as to reduce vertical footprint while limiting coupling between these arrays.

It should also be noted that the invention is not limited to the embodiments or variants as described above. It will indeed appear to the person skilled in the art that various modifications can be made to the embodiments or variants described above, in light of the teaching which has just been disclosed to him/her.

In the detailed presentation of the invention which is made previously, the terms used should not be interpreted as limiting the invention to the embodiments set out in the present description, but must be interpreted to include all the equivalents for which the prediction is within the reach of the person skilled in the art by applying his/her general knowledge to the implementation of the teaching which has just been disclosed to him/her.

The invention claimed is:

1. An antenna device comprising:

a low-frequency array of low-frequency dipoles having respective centers aligned on a so-called vertical axis;

a high-frequency array of high-frequency dipoles having respective centers following one another vertically; and a support for the low-frequency dipoles and the high-frequency dipoles;

wherein the high-frequency dipoles are arranged so that the center of each low-frequency dipole is positioned vertically between the centers of a pair of two high-frequency dipoles, wherein the support comprises a main support along which the low-frequency dipoles are arranged vertically, and an auxiliary support along which the high-frequency dipoles are arranged vertically, said auxiliary support being fixed to the main support, wherein the main support is a hollow, electrically conductive main mast, and wherein said device further comprises a coaxial line comprising at least one inner conductor electrically connecting the low-frequency dipoles to the same input/output connector of the low-frequency array, so that the main mast constitutes a return line to a common electrical ground.

2. The device according to claim 1, further comprising on the main mast a decoupling device of the low-frequency dipoles relative to the high-frequency dipoles, said decoupling device being fixed on the main mast and connected to the inner conductor of the coaxial line of the low-frequency array.

3. The device according to claim 2, wherein the decoupling device is a coaxial low-pass filter disposed at the input of the low-frequency array, said filter comprising an alternation of coaxial sections of high and low impedance.

4. The device according to claim 2, wherein the decoupling device comprises one or more frequency rejector filters.

5. The device according to claim 1, wherein the center of each low-frequency dipole is arranged vertically in the middle of the centers of the pair of high-frequency dipoles.

6. The device according to claim 1, wherein the centers of the high-frequency dipoles of each pair are vertically aligned.

7. The device according to claim 1, in which the centers of the high-frequency dipoles of at least one pair are offset horizontally on one side of the centers of the low-frequency dipoles, while the centers of at least one other pair of high-frequency dipoles are offset horizontally to the other side of the low-frequency dipoles.

8. The device according to claim 7, wherein the pairs of high-frequency dipoles are arranged alternately on either side of the low-frequency dipoles.

9. The device according to claim 7, wherein the two pairs of high-frequency dipoles associated with two consecutive low-frequency dipoles are offset horizontally on the same side of the low-frequency dipoles.

10. The device according to claim 1, wherein the low-frequency dipoles and the high-frequency dipoles are inclined relative to each other.

11. The device according to claim 1, wherein at least one high-frequency dipole is disposed in the center of a low-frequency dipole.

12. The device according to claim 1, wherein the low-frequency dipoles and/or the high-frequency dipoles comprise two arms co-linear and of the same length, preferably equal to a quarter of the wavelength associated with an operating frequency of said respective array.

13. The device according to claim 1, wherein the auxiliary support comprises at least one hollow, electrically conductive auxiliary mast, said device further comprising a coaxial line comprising at least one inner conductor running inside said at least one auxiliary mast and electrically connecting the high-frequency dipoles to the same input/output connector of the high-frequency array, so that said at least one mast constitutes a return line to a common electrical ground.

14. The device according to claim 13, further comprising a device for decoupling the high-frequency dipoles from the low-frequency dipoles, said decoupling device being connected to the inner conductor of the coaxial line of the low-frequency array.

15. The device according to claim 1, further comprising for each low-frequency dipole, at least one quarter-wave trap disposed around a leg of the low-frequency dipole.

16. The device according to claim 15, wherein the leg of the dipole comprises two fixing tubes parallel to each other, the quarter-wave trap comprising two hollow, longitudinally truncated cylindrical bodies so as to each have a flat surface, the two cylindrical bodies being disposed respectively around each of the two fixing tubes, so that the flat surfaces of the two cylindrical bodies are facing each other.

17. A communication system configured to transmit and/or receive radio frequency signals in at least two distinct frequency bands, comprising the antenna device claim 1.

* * * * *